(12) United States Patent
Frenne et al.

(10) Patent No.: US 12,388,594 B2
(45) Date of Patent: Aug. 12, 2025

(54) PTRS TO DMRS PORT ASSOCIATION

(71) Applicant: Telefonaktiebolaget LM Ericsson (publ), Stockholm (SE)

(72) Inventors: Mattias Frenne, Uppsala (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 419 days.

(21) Appl. No.: 17/774,543

(22) PCT Filed: Nov. 3, 2020

(86) PCT No.: PCT/IB2020/060328
§ 371 (c)(1),
(2) Date: May 5, 2022

(87) PCT Pub. No.: WO2021/090180
PCT Pub. Date: May 14, 2021

(65) Prior Publication Data
US 2022/0385427 A1  Dec. 1, 2022

Related U.S. Application Data

(60) Provisional application No. 62/932,785, filed on Nov. 8, 2019.

(51) Int. Cl.
*H04L 5/00* (2006.01)
(52) U.S. Cl.
CPC .................. *H04L 5/0051* (2013.01)
(58) Field of Classification Search
CPC .................................................. H04L 5/0051
See application file for complete search history.

(56) References Cited

U.S. PATENT DOCUMENTS

2019/0296876 A1  9/2019 Zhang et al.
2023/0171076 A1* 6/2023 Kim ...................... H04L 5/0051
370/329

FOREIGN PATENT DOCUMENTS

CN        108111272 A    6/2018
CN        109565429 A    4/2019

OTHER PUBLICATIONS

Huawei Hisilicon: "Feature Summary of Enhancements on Multi-TRP/Panel Transmission", 3GPP Draft; R1-1911425 Flsummary_MTRP 98BIS_V2, 3rd Generation Partnership Project (3GPP), Mobile Competence Centre ; 650 , Route Des Lucioles ; F-06921 Sophia-Antipolis Cedex ; France, vol. RAN WG1, No. Chongqing, Chi (Year: 2019).*

(Continued)

*Primary Examiner* — Michael A Keller
(74) *Attorney, Agent, or Firm* — Withrow & Terranova, PLLC

(57) ABSTRACT

Systems and methods for Phase Tracking Reference Signal (PTRS) to Demodulation Reference Signal (DMRS) association when two or more Transmission Configuration Indication (TCI) states are indicated for a Physical Downlink Shared Channel (PDSCH) transmission in a cellular communications system are disclosed. In one embodiment, a method performed by a WCD comprises receiving a Physical Downlink Control Channel (PDCCH) comprising Downlink Control Information (DCI) that indicates two Transmission Configuration Indication (TCI) states for a PDSCH transmission to the WCD and DMRS ports within a single Code Division Multiplexing (CDM) group. The method further comprises determining a PTRS port to DMRS port association for the PDSCH transmission, wherein a single PTRS port is used for the PDSCH transmission and determining the PTRS port to DMRS port association comprises determining that the single PTRS port (Continued)

is associated with a lowest indexed DMRS port in the DMRS ports indicated in the DCI.

10 Claims, 15 Drawing Sheets

(56) References Cited

OTHER PUBLICATIONS

3GPP Draft; FL Summary NR_EMIMO RAN1#98BIS-MTRP, 3rd Generation Partnership Project (3GPP), Mobile Competence Centre; 650, Route Des Lucioles; F-06921 Sophia-Antipolis Cedex ; France, Oct. 29, 2019 (Oct. 29, 2019), XP051812943 (Year: 2019).*
Samsung, "R1-1911730: Summary of Agreements Up to RAN1#98bis," 3GPP Draft, Section 2.2, Oct. 29, 2019, 24 pages.
Author Unknown, "Technical Specification Group Radio Access Network; NR; Physical channels and modulation (Release 15)," Technical Specification 38.211, Version 15.6.0, Jun. 2019, 3GPP Organizational Partners, 93 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Author Unknown, "Technical Specification Group Radio Access Network; NR; Radio Resource Control (RRC) protocol specification (Release 15)," Technical Specification 38.331, Version 15.7.0, Sep. 2019, 3GPP Organizational Partners, 527 pages.
CATT, "R1-1806285: Remaining issues on PT-RS," 3GPP TSG RAN WG1 Meeting #93, May 21-25, 2018, Busan, Korea, 6 pages.
Ericsson, "R1-1910nnn: Finalizing issues for mTRP," 3GPP TSG RAN WG1 #99, Oct. 14-20, 2019, Chongqing, China, 3 pages.
Huawei, et al., "R1-1911425: Feature Summary of Enhancements on Multi-TRP/Panel Transmission," 3GPP TSG RAN WG1 Meeting #98bis, Oct. 14-20, 2019, Chongqing, China, 100 pages.
Lenovo, et al., "R1-1910142: Discussion of multi-TRP/panel transmission," 3GPP TSG RAN WG1 Meeting #98bis, Oct. 14-18, 2019, Chongqing, China, 14 pages.
Nokia, "R1-1807242: CR to 38.214: maintenance according to agreed Rel 15 features," 3GPP TSG-RAN1 Meeting #93, May 21-25, 2018, Busan, Korea, 5 pages.
Invitation to Pay Additional Fees and Partial Search for International Patent Application No. PCT/IB2020/060328, mailed Feb. 24, 2021, 15 pages.
International Search Report and Written Opinion for International Patent Application No. PCT/IB2020/060328, mailed Apr. 23, 2021, 23 pages.
International Preliminary Report on Patentability for International Patent Application No. PCT/IB2020/060328, mailed Jan. 24, 2022, 47 pages.
ZTE, et al., "R1-1719542: Remaining details on DL DMRS and UL DMRS," 3GPP TSG RAN WG1 Meeting 91, Nov. 27-Dec. 1, 2017, Reno, Nevada, 28 pages.
First Office Action for Chinese Patent Application No. 202080093130.8, mailed Dec. 9, 2023, 8 pages.
Examination Report for European Patent Application No. 20804354.7, mailed May 31, 2023, 10 pages.

* cited by examiner

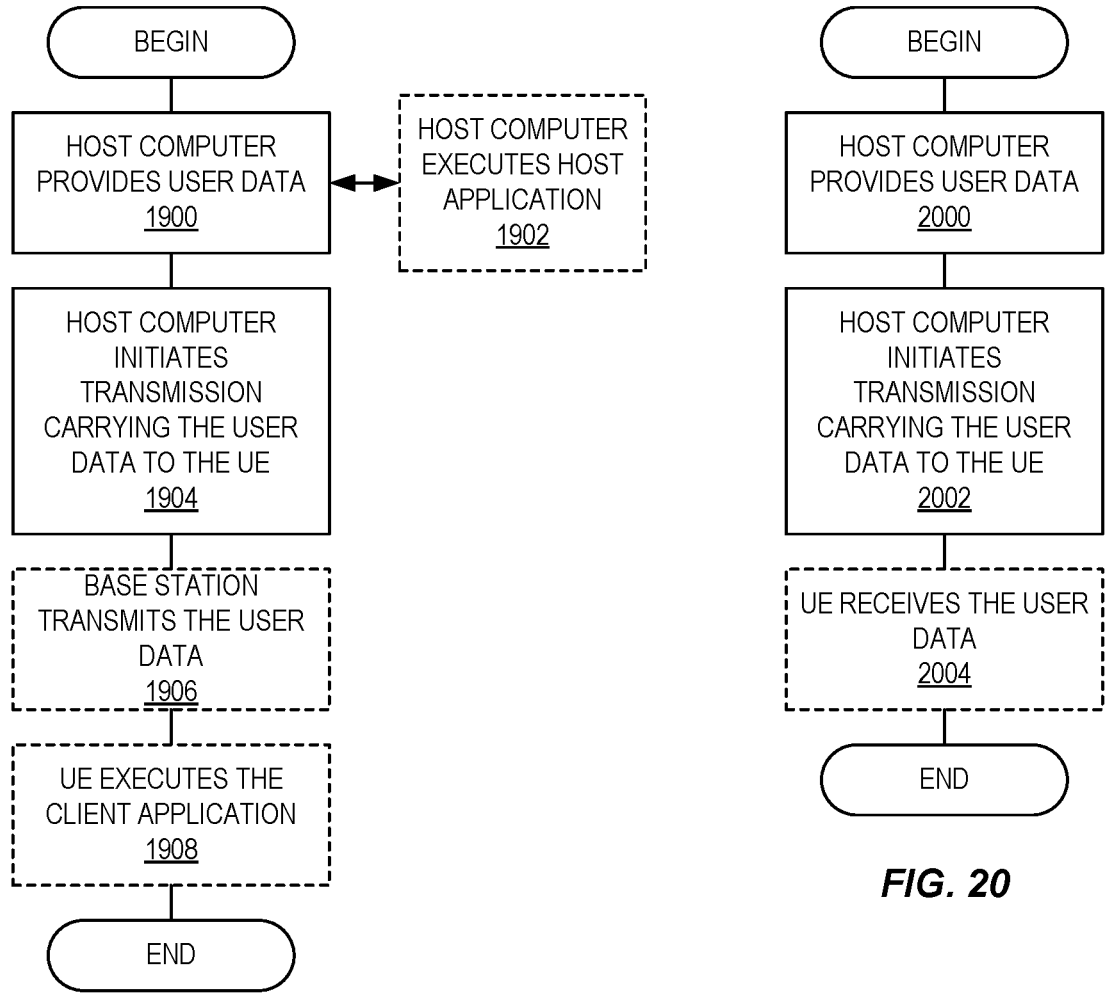

PTRS TO DMRS PORT ASSOCIATION

RELATED APPLICATIONS

This application is a 35 U.S.C. § 371 national phase filing of International Application No. PCT/IB2020/060328, filed Nov. 3, 2020, which claims the benefit of provisional patent application Ser. No. 62/932,785, filed Nov. 8, 2019, the disclosures of which are hereby incorporated herein by reference in their entireties.

TECHNICAL FIELD

The present disclosure relates to a cellular communications system and, in particular, to a cellular communications system that supports Multi-Transmission/Reception Point (TRP) transmission.

BACKGROUND

In Third Generation Partnership Project (3GPP) New Radio (NR), Phase Tracking Reference Signal (PTRS or PT-RS) can be configured for downlink and uplink transmissions in order for the receiver to correct phase noise related errors. The PTRS configuration is User Equipment (UE)-specific, and the PTRS is associated with one of the Demodulation Reference Signal (DMRS or DM-RS) ports used for the transmission. This means that DMRS and its associated PTRS are transmitted using the same precoder and the modulated symbol used for the PTRS is taken from the DMRS, whatever DMRS sequence is configured. This means that there is no specific configuration of the PTRS sequence, as it borrows from the DMRS.

DMRS in NR

The UE assumes that the Physical Downlink Shared Channel (PDSCH) DMRS is mapped to physical resources according to type 1 or type 2 as given by the higher-layer parameter DL-DMRS-contig-type. The UE assumes the sequence r(m) is mapped to physical Resource Elements (REs) according to:

$$a_{k,l}^{(p,\mu)} = \beta_{DMRS} w_f(k') \cdot w_t(l') \cdot r(2m + k' + n_0)$$

$$k = \begin{cases} 4m + 2k' + \Delta & \text{Configuration type 1} \\ 6m + k' + \Delta & \text{Configuration type 2} \end{cases}$$

$$k' = 0, 1$$

$$l = \{l_0, \bar{l}\} + l'$$

where $w_f(k')$, $w_t(l')$, and $\Delta$ are given by Tables 7.4.1.1.2-1 and 7.4.1.1.2-2 in 3GPP Technical Specification (TS) 38.211 V15.6.0 (reproduced below as Tables 1 and 2) and the following condition is fulfilled:

the REs are within the resources allocated for PDSCH transmission.

The reference point for k is the start of the carrier bandwidth part i in which the PDSCH is transmitted with k=0 corresponding to the lowest-numbered subcarrier in the bandwidth part. The offset $n_0$ is given by:

$$n_0 = \begin{cases} N_{BWP,i}^{start} N_{sc}^{RB}/2 & \text{Configuration type 1} \\ N_{BWP,i}^{start} N_{sc}^{RB}/3 & \text{Configuration type 2} \end{cases}$$

where $N_{BWP,i}^{start}$ is the start of the carrier bandwidth part within which the Physical Uplink Shared Channel (PUSCH) is transmitted.

The reference point for l and the position $l_0$ of the first DMRS symbol depends on the mapping type:

for PDSCH mapping type A:

l is defined relative to the start of the slot, and $l_0=3$ if the higher-layer parameter DL-DMRS-typeA-pos equals 3 and $l_0=2$ otherwise, for PDSCH mapping type B:

l is defined relative to the start of the scheduled PDSCH resources, and $l_0=0$.

The position(s) of additional DMRS symbols is given by $\bar{l}$ and the last Orthogonal Frequency Division Multiplexing (OFDM) symbol used for PDSCH in the slot according to Tables 7.4.1.1.2-3 and 7.4.1.1.2-4 in 3GPP TS 38.211 V15.6.0 (reproduced below as Tables 3 and 4).

The time-domain index l' and the supported antenna ports p are given by Table 7.4.1.1.2-5 (reproduced below as Table 5) where:

single-symbol DMRS is used if the higher-layer parameter DL-DMRS-len is equal to 1, and single-symbol or double-symbol DMRS is given determined by the associated Downlink Control Information (DCI) if the higher-layer parameter DL-DMRS-len is equal to 2.

TABLE 1

(Reproduction of Table 7.4.1.1.2-1: Parameters for PDSCH DMRS configuration type 1, from 3GPP TS 38.211 v15.6.0)

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

TABLE 2

(Reproduction of Table 7.4.1.1.2-2: Parameters for PDSCH DMRS configuration type 2, from 3GPP TS 38.211 v15.6.0)

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

TABLE 3

(Reproduction of Table 7.4.1.1.2-3:
Additional PDSCH DMRS positions $\bar{l}$ for
single-symbol DMRS, from 3GPP TS 38.211 v15.6.0)

| Position of last PDSCH symbol | PDSCH mapping type A DL-DMRS-add-pos | | | | PDSCH mapping type B DL-DMRS-add-pos | | | |
|---|---|---|---|---|---|---|---|---|
| | 0 | 1 | 2 | 3 | 0 | 1 | 2 | 3 |
| ≤7 | — | — | — | — | — | | | |
| 8 | — | 7 | | | — | | | |
| 9 | — | 9 | 6, 9 | | — | | | |
| 10 | — | 9 | 6, 9 | | — | | | |
| 11 | — | 9 | 6, 9 | 5, 8, 11 | — | | | |
| 12 | — | 11 | 7, 11 | 5, 8, 11 | — | | | |
| 13 | — | 11 | 7, 11 | 5, 8, 11 | — | | | |

TABLE 4

(Reproduction of Table 7.4.1.1.2-4: Additional
PDSCH DMRS positions $\bar{l}$ for double-symbol
DMRS, from 3GPP TS 38.211 v15.6.0)

| Position of last PDSCH symbol | PDSCH mapping type A DL-DMRS-add-pos | | | PDSCH mapping type B DL-DMRS-add-pos | | |
|---|---|---|---|---|---|---|
| | 0 | 1 | 2 | 0 | 1 | 2 |
| ≤7 | — | — | — | — | | |
| 8 | — | — | — | — | | |
| 9 | — | 8 | | — | | |
| 10 | — | 8 | | — | | |
| 11 | — | 8 | | — | | |
| 12 | — | 10 | | — | | |
| 13 | — | 10 | | — | | |

TABLE 5

(Reproduction of Table 7.4.1.1.2-5: PDSCH DMRS time index l'
and antenna ports p, from 3GPP TS 38.211 v15.6.0)

| Single or double symbol DM-RS | l' | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

In FIG. 1 and FIG. 2, the mapping of the different DMRS ports for DMRS type 1 and 2 for single front-loaded cases is shown. An important aspect is that PTRS is not scheduled when using Time Domain Orthogonal Cover Code(s) (TD-OCC(s)) for the DMRS. Therefore, PTRS will never be present when using DMRS ports 1004-1007 for DMRS type 1 and ports 1006-1011 for DMRS type 2.

In addition, when the rank is 5-8, the PDSCH contains two codewords, while for rank 1-4 only a single codeword is transmitted. When PTRS is present, the maximum rank is 6. The following DMRS ports are used for the case of two codeword transmissions:

Rank 5:
  DMRS Type 1: port 1000-1004
  DMRS Type 2: port 1000-1004

Rank 6:
  DMRS Type 1: port (1000+) 0,1,2,3,4,6
  DMRS Type 2: port 1000-1005

Codeword to Layer Mapping

When a PDSCH is transmitted with two codewords, there is a rule that decides how the layers of each codeword, CW0 and CWl1, are mapped to the total number of Multiple Input Multiple Output (MIMO) layers. This rule is as follows:
  For rank 5: CW0 is mapped to layers 0 and 1 and CW1 is mapped to layers 2,3,4
  For rank 6: CW0 is mapped to layers 0,1,2 and CW1 is mapped to layers 3,4,5

PTRS in AIR

In NR Release 15 PDSCH transmission, one PTRS port is supported and associated with the PDSCH transmission. For PUSCH, two PTRS ports can be associated with the PUSCH transmission.

Regarding the mapping of PTRS in the frequency domain, each PTRS port is scheduled with at most one subcarrier per Physical Resource Block (PRB). Also, the subcarrier used for a PTRS port must be one of the subcarriers also used for the DMRS port associated with the PTRS port. In FIG. 3, an example of allowed PTRS mapping is shown. In FIG. 4, an example of a not allowed PTRS mapping is shown. Hence, if a comb-based structure is used for DMRS with a repetition factor (RPF) of two (as in DMRS configuration type 1), then DMRS is mapped to every second subcarrier. Consequently, the PTRS can only be mapped to 6 out of 12 subcarriers in this example.

Since there are six alternative subcarriers in Type 1, there is a procedure defined to determine which subcarrier the DMRS is mapped to. An offset dependent on $k_{ref}^{RE}$, is specified, see Table 6.4.1.2.2.1-1 in 3GPP TS 38.211 V15.6.0 (reproduced as Table 6 below), where for example, if DMRS port 2 is indicated when scheduling PDSCH and the higher layer parameter resourceElementOffset is configured to 10, then the table gives $k_{ref}^{RE}=7$ and hence the PTRS is mapped to subcarrier 7, as in FIG. 3.

TABLE 6

(Reproduction of Table 6.4.1.2.2.1-1: The parameter $k_{ref}^{RE}$, from 3GPP TS 38.211 v15.6.0)

| DM-RS antenna port $\tilde{p}$ | DM-RS Configuration type 1 resourceElementOffset | | | | DM-RS Configuration type 2 resourceElementOffset | | | |
|---|---|---|---|---|---|---|---|---|
| | 00 | 01 | 10 | 11 | 00 | 01 | 10 | 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

In addition, the NR specification states that if a PDSCH contains two codewords, i.e. two separately encoded transport blocks, then:
  If a UE is scheduled with two codewords, the PT-RS antenna port is associated with the lowest indexed DM-RS antenna port among the DM-RS antenna ports assigned for the codeword with the higher MCS. If the MCS indices of the two codewords are the same, the PT-RS antenna port is associated with the lowest indexed DM-RS antenna port The reason for this is that it is beneficial to map the PTRS to MIMO layers which have the strongest signal to noise ratio, since it improves phase tracking performance. Due to Channel State Information (CSI) feedback, the NR base station (gNB) can adjust the Modulation and Coding Scheme (MCS) per codeword. If a higher MCS is selected, it means that the layers used by that codeword have higher signal to noise ratios at the receiver, and thus the PTRS is associated with one of the DMRS ports of that "stronger" codeword.

In regard to PTRS power allocation, according to 3GPP NR specification TS 38.214 V15.6.0, when a UE is scheduled with a PTRS port associated with a PDSCH, if the UE is configured with a higher layer parameter epre-Ratio, the ratio of PTRS Energy Per Resource Element (EPRE) to PDSCH EPRE per layer per RE for PTRS port, $\rho_{PTRS}$, is 0 given by Table 4.1-2 in TS 38.214 V15.6.0 (reproduced below as Table 7) according to the epre-Ratio, where the unit of $\rho_{PTRS}$ is in decibels (dB). The PTRS scaling factor $\beta_{PTRS}$ specified in subclause 7.4.1.2.2 of 3GPP TS 38.211 V15.6.0 is given by:

$$\beta_{PTRS} = 10^{\frac{\rho_{PTRS}}{20}}.$$

Otherwise, if the UE is not configured with epre-Ratio, the UE assumes epre-Ratio is set to state '0' in Table 4.1-2 if not configured.

TABLE 7

(Reproduction of Table 4.1-2: PTRS EPRE to PDSCH EPRE per layer per RE ($\rho_{PTRS}$), from 3GPP TS38.214 v15.6.0)

| epre-Ratio | The number of PDSCH layers | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | | | | reserved | | |
| 3 | | | | reserved | | |

Quasi Co-Located (QCL) and Transmission Configuration Indication (TCI) States

Several signals can be transmitted from the same base station antenna from different antenna ports. These signals can have the same large-scale properties, for instance in terms of Doppler shift/spread, average delay spread, or average delay. These antenna ports are then said to be QCL.

The network can then signal to the UE that two antenna ports are QCL. If the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI Reference Signal (CSI-RS) (known as the source Reference Signal (RS)) and the second antenna port is a DMRS (known as the target RS).

For instance, if antenna ports A and B are QCL with respect to average delay, the UE can estimate the average delay from the signal received from antenna port A (source RS) and assume that the signal received from antenna port B (target RS) has the same average delay. This is useful for demodulation since the UE can know beforehand the properties of the channel when trying to measure the channel utilizing the DMRS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL Type D was introduced to facilitate beam management with analog beamforming and is known as spatial QCL. There is currently no strict definition of spatial QCL, but the understanding is that, if two transmitted antenna ports are spatially QCL, the UE can use the same receive (Rx) beam to receive them. Note that for beam management, the discussion mostly revolves around QCL Type D, but it is also necessary to convey a Type A QCL relation for the RSs to the UE so that it can estimate all the relevant large-scale parameters.

Typically, this is achieved by configuring the UE with a CSI-RS for Tracking RS (TRS) for time/frequency offset estimation. To be able to use any QCL reference, the UE would have to receive it with a sufficiently good Signal to Interference plus Noise Ratio (SINR). In many cases, this means that the TRS has to be transmitted in a suitable beam to a certain UE.

To introduce dynamics in beam and Transmission/Reception Point (TRP) selection, the UE can be configured through Radio Resource Control (RRC) signaling with N TCI states, where N is up to 128 in frequency range 2 (FR2) and up to 8 in frequency range 1 (FR1), depending on UE capability. Each TCI state contains QCL information, i.e. one or two source downlink RSs, each source RS associated with a QCL type. For example, a TCI state contains a pair of RSs, each associated with a QCL type, e.g. two different CSI-RSs {CSI-RS1, CSI-RS2} is configured in the TCI state as {qcl-Type1,qcl-Type2}={Type A, Type D}. This means the UE can derive Doppler shift, Doppler spread, average delay, delay spread from CSI-RS1, and spatial Rx parameter (i.e., the Rx beam to use) from CSI-RS2. In case Type D (spatial information) is not applicable, such as low or mid-band operation, then a TCI state contains only a single source RS.

Each of the N states in the list of TCI states can be interpreted as a list of N possible beams transmitted from the network or a list of N possible TRPs used by the network to communicate with the UE. A first list of available TCI states is configured for PDSCH, and a second list for PDCCH contains pointers, known as TCI state Identifiers (IDs), to a subset of the TCI states configured for PDSCH. The network then activates one TCI state for PDCCH (i.e., provides a TCI for PDCCH) and activates up to M TCI states for PDSCH. The number M of active TCI states the UE can support is a UE capability but the maximum in NR Release 15 is eight (8).

Each configured TCI state contains parameters for the QCL associations between source RSs (CSI-RS or Synchronization Signal (SS)/Physical Broadcast Channel (PBCH)) and target RSs (e.g., PDSCH/PDCCH DMRS ports). TCI states are also used to convey QCL information for the reception of CSI-RS.

Assume a UE is configured with four active TCI states from a list of sixty-four (64) configured TCI states. Hence, sixty TCI states are inactive, and the UE need not be prepared to have large-scale parameters estimated for those inactive TCI states. But the UE continuously tracks and updates the large-scale parameters for the four active TCI states by measurements and analysis of the source RSs indicated by each TCI state.

In NR Release 15, when scheduling a PDSCH to a UE, the DCI contains a pointer to one active TCI. The UE then knows which large-scale parameter estimate to use when performing PDSCH DMRS channel estimation and thus PDSCH demodulation.

NR Release 16 Enhancements for PDSCH with Multi-TRPs

In NR Release 16, there are discussions ongoing on the support of PDSCH with multiple TRPs (i.e., with multi-TRPs). One mechanism that is being considered in NR Release 16 is a single Physical Downlink Control Channel (PDCCH) scheduling one or multiple PDSCHs from different TRPs. The single PDCCH is received from one of the TRPs. FIG. 5 shows an example where a DCI received by the UE in a PDCCH from TRP1 schedules two PDSCHs. The first PDSCH (PDSCH1) is received from TRP1, and the second PDSCH (PDSCH2) is received from TRP2. Alternatively, the single PDCCH schedules a single PDSCH where PDSCH layers are grouped into two groups and where layer group 1 is received from TRP1 and layer group 2 is received from TRP2. In such cases, each PDSCH or layer group is transmitted from a different TRP and has a different TCI state associated with it. In the example of FIG. 5, PDSCH1 is associated with TCI State p, and PDSCH 2 is associated with TCI state q.

In the RAN1 AdHoc meeting in January 2019, the following was agreed:

Agreement

TCI indication framework shall be enhanced in Rel-16 at least for eMBB:

Each TCI code point in a DCI can correspond to 1 or 2 TCI states

When 2 TCI states are activated within a TCI code point, each TCI state corresponds to one CDM group, at least for DMRS type 1

FFS design for DMRS type 2

FFS: TCI field in DCI, and associated MAC-CE signaling impact

According to the above agreement, each code point in the DCI Transmission Configuration Indication field can be mapped to either 1 or 2 TCI states. This can be interpreted as follows: A DCI in PDCCH schedules 1 or 2 PDSCHs (or 1 or 2 layer groups if a single PDSCH) where each PDSCH or layer group is associated with a different TCI state; the code point of the Transmission Configuration Indication field in DCI indicates the 1-2 TCI states associated with the 1 or 2 PDSCHs or layer groups scheduled. In this case, the two DMRSs of the two PDSCHs or the two layer groups respectively are not mapped to the same DMRS Code Division Multiplexing (CDM) group. When two TCI states are indicated by a TCI code point, for DMRS type 1 and type 2, if indicated DMRS ports are from two CDM groups, the first TCI state corresponds to the CDM group of the first antenna port indicated by the antenna port indication table.

Introducing Two PTRS Ports in Multi-TRP Operation in Release 16

In a Release 16 work item in 3GPP, it has been agreed:

Agreement

Support two PTRS ports for single-PDCCH based multi-TRP/Panel transmission at least for eMBB and URLLC scheme 1a if two TCI states are indicated by one TCI code point, whereas the first/second PTRS port is associated with the lowest indexed DMRS port within the DMRS ports corresponding to the first/second indicated TCI state, respectively RRC signaling is used to configure the two PTRS ports Note that whether supporting two PTRS ports is subject to UE capability FFS: Applicability for other cases In case of rank 5 or 6 scheduling (two codewords), this agreement means you select the lowest DMRS port index from each TCI state.

Problems with Existing Solutions

There currently exist certain challenge(s). The recent agreement on two PTRS ports and the association to TCI states does not allow for mapping the PTRS ports to the strongest MIMO layers. This degrades the performance of the phase tracking functionality of PTRS and increases the block error rate which reduces the throughput. How to allocate transmit power for each of the two PTRS ports is another issue which is a problem to be resolved.

SUMMARY

Systems and methods for Phase Tracking Reference Signal (PTRS) to Demodulation Reference Signal (DMRS) association when two or more Transmission Configuration Indication (TCI) states are indicated for a Physical Downlink Shared Channel (PDSCH) transmission in a cellular communications system are disclosed. In one embodiment, a method performed by a WCD comprises receiving a Physical Downlink Control Channel (PDCCH) comprising Downlink Control Information (DCI) that indicates two Transmission Configuration Indication (TCI) states for a PDSCH transmission to the WCD and DMRS ports within a single Code Division Multiplexing (CDM) group. The method further comprises determining a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI. In this manner, the single PTRS is associated to the lowest indexed DMRS port such that performance is improved.

In one embodiment, the method further comprises receiving the single PTRS port associated with the lowest indexed DMRS port in the DMRS ports indicated in the DCI.

In one embodiment, the single PTRS port is one of two PTRS ports configured for the WCD.

In one embodiment, a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state.

Corresponding embodiments of a WCD are also disclosed. In one embodiment, a WCD for a cellular communications system is adapted to receive a PDCCH comprising DCI that indicates two TCI states for a PDSCH transmission to the WCD and DMRS ports within a single CDM group. The WCD is further adapted to determine a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI.

In one embodiment, a WCD for a cellular communications system comprises one or more transmitters, one or more receivers, and processing circuitry associated with the one or more transmitters and the one or more receivers. The processing circuitry is configured to cause the WCD to receive a PDCCH comprising DCI that indicates two TCI states for a PDSCH transmission to the WCD and DMRS ports within a single CDM group. The processing circuitry is further configured to cause the WCD to determine a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI.

In another embodiment, a method performed by a WCD comprises receiving a PDCCH comprising DCI that indicates two TCI states for a PDSCH transmission to the WCD and DMRS ports within a single CDM group. The method further comprises receiving a single PTRS port for the PDSCH transmission, wherein the single PTRS port is associated with a lowest indexed DMRS port in the DMRS ports indicated in the DCI.

In one embodiment, the single PTRS port is one of two PTRS ports configured for the WCD.

In one embodiment, a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state.

Corresponding embodiments of a WCD are also disclosed. In one embodiment, a WCD for a cellular communications system is adapted to receive a PDCCH comprising DCI that indicates two TCI states for a PDSCH transmission to the WCD and DMRS ports within a single CDM group and receive a single Phase PTRS port for the PDSCH transmission, wherein the single PTRS port is associated with a lowest indexed DMRS port in the DMRS ports indicated in the DCI.

In one embodiment, a WCD for a cellular communications system comprises one or more transmitters, one or more receivers, and processing circuitry associated with the one or more transmitters and the one or more receivers. The processing circuitry is configured to cause the WCD to receive a PDCCH comprising DCI that indicates two TCI states for a PDSCH transmission to the WCD and DMRS ports within a single CDM group and receive a single Phase PTRS port for the PDSCH transmission, wherein the single PTRS port is associated with a lowest indexed DMRS port in the DMRS ports indicated in the DCI.

Embodiments of a method performed by a network node are also disclosed. In one embodiment, a method performed by a network node of a cellular communications system comprises transmitting or initiating transmission of a PDCCH to a WCD, the PDCCH comprising DCI that indicates two TCI states for a PDSCH transmission to the WCD and DMRS ports within a single CDM group. The method further comprises determining a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI.

In one embodiment, the method further comprises transmitting or initiating transmission of the single PTRS port associated with the lowest indexed DMRS port in the DMRS ports indicated in the DCI.

In one embodiment, the single PTRS port is one of two PTRS ports configured for the WCD.

In one embodiment, a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state.

Corresponding embodiments of a network node are also disclosed. In one embodiment, a network node for a cellular communications system is adapted to transmit or initiate transmission of a PDCCH to a WCD, the PDCCH comprising DCI that indicates two TCI states for a PDSCH transmission to the WCD and DMRS ports within a single CDM group. The network node is further adapted to determine a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI.

In one embodiment, a network node for a cellular communications system comprises processing circuitry configured to cause the network node to transmit or initiate transmission of a PDCCH to a WCD, the PDCCH comprising DCI that indicates two TCI states for a PDSCH transmission to the WCD and DMRS ports within a single CDM group. The processing circuitry is further configured to cause the network node to determine a PTRS port to DMRS port association for the PDSCH transmission, wherein a single PTRS port is used for the PDSCH transmission and determining the PTRS port to DMRS port association comprises determining that the single PTRS port is associated with a lowest indexed DMRS port in the DMRS ports indicated in the DCI.

In another embodiment, a method performed by a network node of a cellular communications system comprises transmitting or initiating transmission of a PDCCH to a WCD, the PDCCH comprising DCI that indicates two TCI states for a PDSCH transmission to the WCD and DMRS ports within a single CDM group. The method further comprises transmitting or initiating transmission of a single PTRS port for the PDSCH transmission, wherein the single PTRS port is associated with a lowest indexed DMRS port in the DMRS ports indicated in the DCI.

In one embodiment, the single PTRS port is one of two PTRS ports configured for the WCD.

In one embodiment, a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state.

Corresponding embodiments of a network node are also disclosed. In one embodiment, a network node for a cellular communications system is adapted to transmit or initiate transmission of a PDCCH to a WCD, the PDCCH comprising DCI that indicates two TCI states for a PDSCH transmission to the WCD and DMRS ports within a single CDM group and transmit or initiate transmission of a single PTRS port for the PDSCH transmission, wherein the single PTRS port is associated with a lowest indexed DMRS port in the DMRS ports indicated in the DCI.

In one embodiment, a network node for a cellular communications system comprises processing circuitry configured to cause the network node to transmit or initiate transmission of a PDCCH to a WCD, the PDCCH comprising DCI that indicates two TCI states for a PDSCH transmission to the WCD and DMRS ports within a single CDM group and transmit or initiate transmission of a single PTRS port for the PDSCH transmission, wherein the single PTRS port is associated with a lowest indexed DMRS port in the DMRS ports indicated in the DCI.

In another embodiment, a method performed by a WCD comprises receiving a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The method further comprises receiving the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

Corresponding embodiments of a WCD are also disclosed. In one embodiment, a WCD for a cellular communications system is adapted to receive a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The WCD is further adapted to receive the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

In one embodiment, a WCD for a cellular communications system comprises one or more transmitters, one or more receivers, and processing circuitry associated with the one or more transmitters and the one or more receivers. The processing circuitry is configured to cause the WCD to receive a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The processing circuitry is further configured to cause the WCD to receive the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

In another embodiment, a method performed by a network node for a cellular communications system comprises transmitting or initiating transmission of a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The method further comprises transmitting or initiating transmission of the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

Corresponding embodiments of a network node are also disclosed. In one embodiment, a network node for a cellular communications system is adapted to transmit or initiate transmission of a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The network node is further adapted to transmit or initiate transmission of the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

In one embodiment, a network node for a cellular communications system comprises processing circuitry configured to cause the network node to transmit or initiate transmission of a PDCCH comprising DCI for a transmission of PDSCH comprising two or more layers to the WCD. The DCI indicates two TCI states for the PDSCH, a first subset of the two or more layers is associated with a first TCI state from among the two TCI states and a second subset of the two or more layers is associated with a second TCI state from among the two TCI states, a first PTRS port is associated with the first TCI state and a second PTRS port is associated with the second TCI state, an amount of power allocation for the first PTRS port depends on a number of layers in the first subset of the two or more layers associated with the first TCI state, and an amount of power allocation for the second PTRS port depends on a number of layers in the second subset of the two or more layers associated with the second TCI state. The processing circuitry is further configured to cause the network node to transmit or initiate transmission of the PDSCH comprising the two or more layers in accordance with the DCI.

In one embodiment, the amount of power allocation for the first PTRS port is such that a ratio of Energy Per Resource Element (EPRE) for the first PTRS port to EPRE per layer for the first subset of the two or more layers of the PDSCH is 0 decibels (dB) if the number of layers in the first subset is 1, 3 dB if the number of layers in the first subset is 2, 4.77 dB if the number of layers in the first subset is 3, and 6 dB if the number of layers in the first subset is 4. Further, the amount of power allocation for the second PTRS port is such that a ratio of EPRE for the second PTRS port to EPRP per layer for the second subset of the two or more layers of the PDSCH is 0 dB if the number of layers in the second subset is 1, 3 dB if the number of layers in the second subset is 2, 4.77 dB if the number of layers in second first subset is 3, and 6 dB if the number of layers in the second subset is 4.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 19 and 20 are flow charts that illustrate example embodiments of methods implemented in a communication system such as that of FIG. 17.

DETAILED DESCRIPTION

Figure 1:
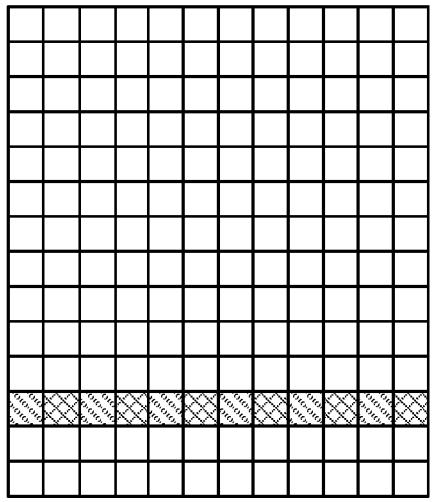
FIGS. 1 and 2 illustrate mapping of different Demodulation Reference Signal (DMRS) ports for DMRS type 1 and DMRS type 2 for single front-loaded cases.
Figure 2:
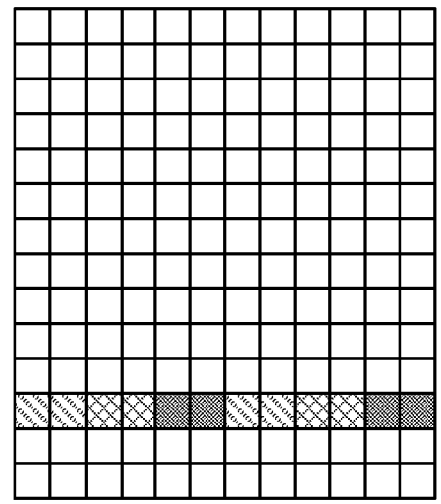
Figure 3:
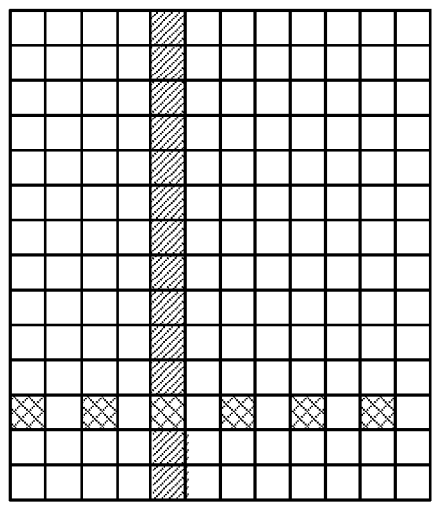
FIG. 3 illustrates an example of an allowed Phase Tracking Reference Signal (PTRS) mapping.
Figure 4:
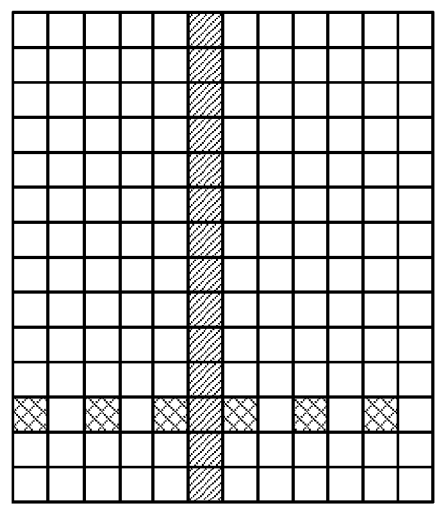
FIG. 4 illustrates an example of a non-allowed PTRS mapping.
Figure 5:
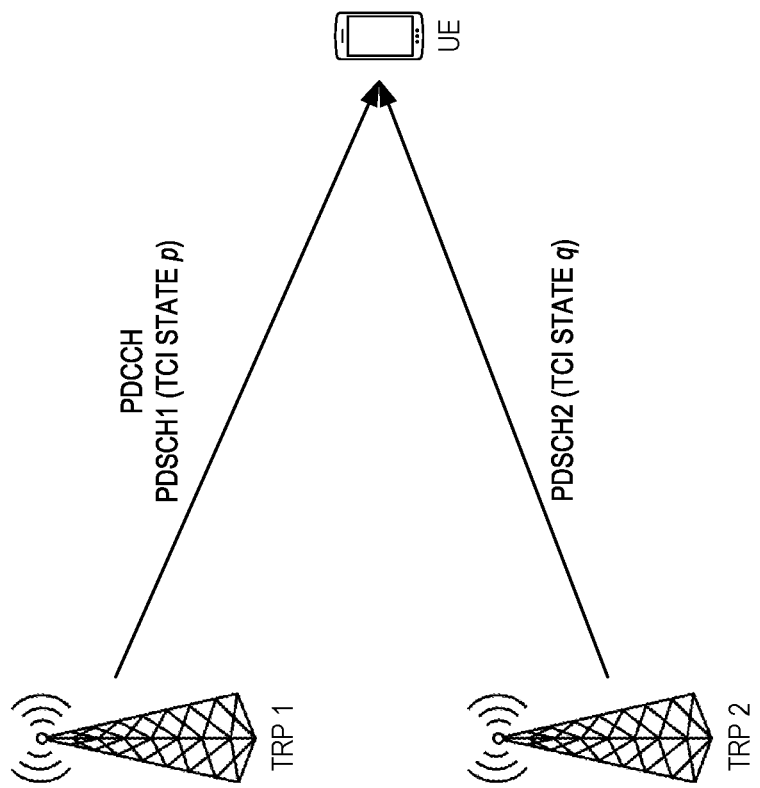
FIG. 5 shows an example where a Downlink Control Information (DCI) received by a User Equipment (UE) in a Physical Downlink Control Channel (PDCCH) from a first Transmission/Reception Point (TRP1) schedules two Physical Downlink Shared Channels (PDSCHs), a first PDSCH from TRP1 and a second PDSCH from a second TRP (TRP2)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there currently exist certain challenge(s) with respect to Phase Tracking Reference Signal (PTRS) port to Multiple Input Multiple Output (MIMO) layer mapping and allocation of transmit power to PTRS ports. In particular, the recent agreement on two PTRS ports and the association to Transmission Configuration Indication (TCI) states does not allow for mapping the PTRS ports to the strongest MIMO layers. This degrades the performance of the phase tracking functionality of PTRS and increases the block error rate which reduces the throughput. Further, how to allocate transmit power for each of the two PTRS ports is a problem that needs to be resolved.

Certain aspects of the present disclosure and their embodiments may provide solutions to the aforementioned or other challenges. In some embodiments, if a UE is scheduled with two codewords and with two PTRS ports enabled, i.e. rank 5-6 transmission, then the PTRS port to Demodulation Reference Signal (DMRS) port association for each TCI state is determined from the subset of DMRS ports that belong to the codeword that has the highest Modulation and Coding Scheme (MCS).

In some embodiments, each TCI state is associated to a set of DMRS ports. The PTRS port to DMRS port association depends on the MCS of the codeword that use DMRS ports associated with the TCI state.

In some embodiments, power allocation for a PTRS port associated to a TCI state is determined by the number PDSCH layers associated with the same TCI state indicated by a DCI.

Certain embodiments may provide one or more of the following technical advantage(s): lower Block Error Rate (BLER), better resilience to phase noise, higher UE throughput, lower probability of retransmission and thus lower physical layer latency, and correct PTRS power allocation can be done when two PTRS ports are configured.

Figure 6:
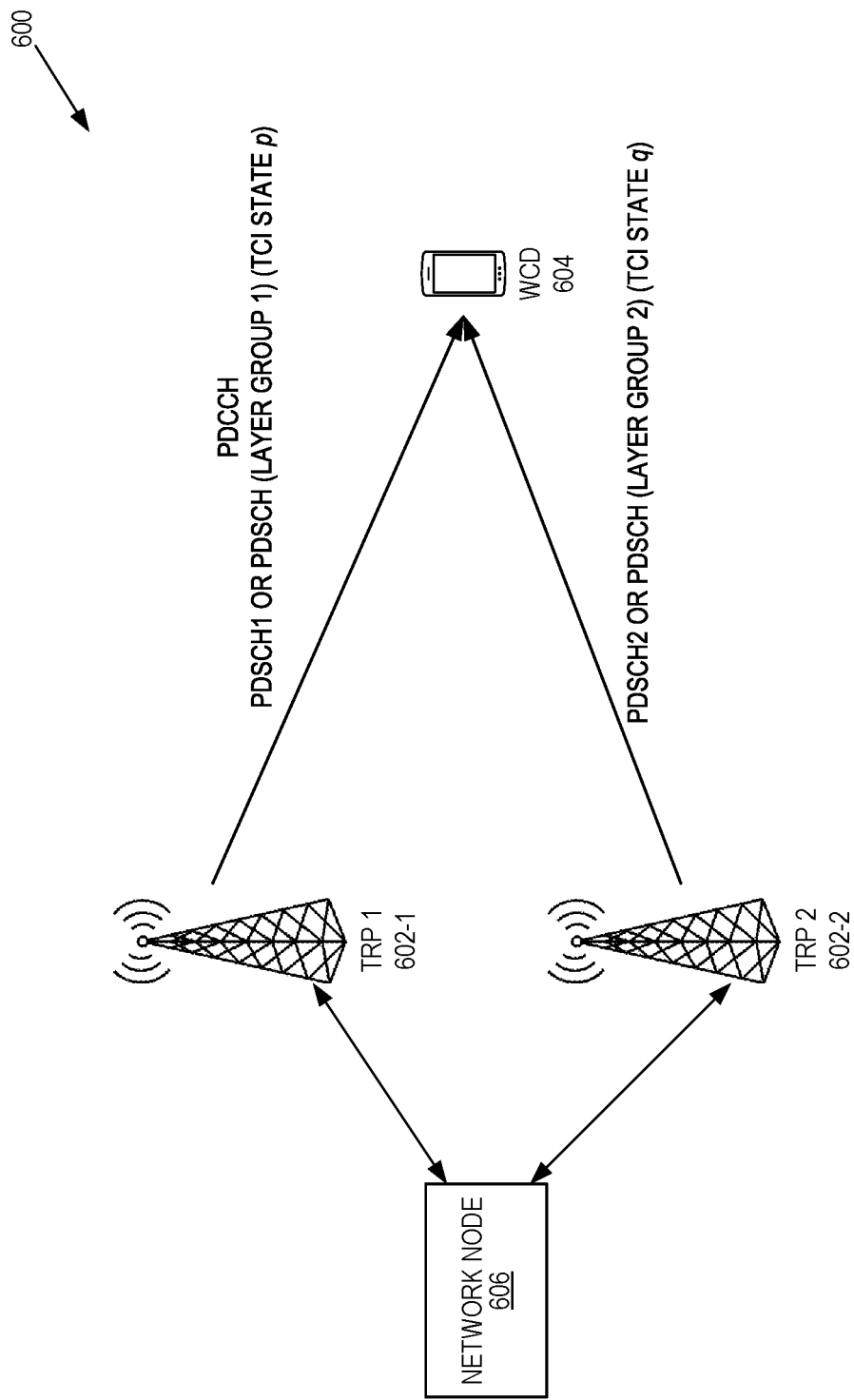
FIG. 6 illustrates one example of a cellular communications system in which embodiments of the present disclosure may be implemented.

FIG. 6 illustrates one example of a cellular communications system 600 in which embodiments of the present disclosure may be implemented. In the embodiments described herein, the cellular communications system 600 is a 5G System (5GS) including a NR RAN or LTE RAN (i.e., Evolved Universal Terrestrial Radio Access (E-UTRA) RAN) or an Evolved Packet System (EPS) including an LTE RAN. In this example, the RAN includes Transmission/Reception Points (TRPs) 602-1 and 602-2. The TRPs 602-1 and 602-2 may also be referred to herein as "transmit points." The TRPs 602-1 and 602-2 may be, e.g., base stations, which in LTE are referred to as eNBs (when connected to a Evolved Packet Core (EPC)) and in 5G NR are referred to as gNBs or next generation eNBs (ng-eNBs) (i.e., LTE RAN nodes connected to a 5G Core (5GC)), or other types of radio access nodes (e.g., low power nodes (e.g., small base stations such as, e.g., pico or femto base stations), Remote Radio Heads (RRHs), or the like).

In the embodiments described herein, the TRPs 602-1 and 602-2 perform a single-control channel (i.e., a single Physical Downlink Control Channel (PDCCH) in this example) multi-TRP (or multi-panel) transmission to a Wireless Communication Device (WCD) 604 (e.g., a UE). More specifically, a network node 606 causes the TRPs 602-1 and 602-2 to perform the single-control channel (i.e., a single PDCCH in this example) multi-TRP (or multi-panel) transmission to the WCD 604 (e.g., a UE). Note that, in many of the example embodiments described below, the WCD 604 is a UE and, as such, is sometimes referred to as UE 604. The network node 606 includes a scheduler and other intelligence to control, instruct, or otherwise cause the TRPs 602-1 and 602-2 to perform the single-control channel (i.e., a single PDCCH in this example) multi-TRP (or multi-panel) transmission to the WCD 604 (e.g., a UE). Note that the network node 606 may be separate from the TRPs 602-1 and 602-2, may be implemented within one of the TRPs 602-1 and 602-2 (e.g., implemented in a base station that serves as the TRP 602-1 and, e.g., where the TRP 602-2 is another base station or some other type of RAN node such as, e.g., a RRH). In some embodiments, the multi-TRP transmission is the transmission of a first Physical Downlink Shared Channel (PDSCH) (PDSCH1) from the TRP 602-1 (also denoted herein as TRP1) and a second PDSCH (PDSCH2) from the TRP 602-2 (also denoted herein as TRP2). In some other embodiments, a single PDSCH is transmitted where the PDSCH layers are grouped into a first layer group (layer group 1) transmitted from the TRP 602-2 and a second layer group (layer group 2) transmitted from the TRP 602-2.

In the embodiments described herein, two PTRS ports are supported for single-PDCCH based multi-TRP (or multi-panel) transmission if two TCI states are indicated by one TCI code point in the PDCCH. Embodiments described herein relate to PTRS port to DMRS port association for two PTRS ports for single PDCCH based multi-TRP (or multi-panel) transmission if two TCI states are indicated by one TCI code point in the PDCCH (i.e., when two codewords (CWs) are scheduled). Embodiments related to allocation of transmit power for each of the PTRS ports is are also disclosed. While these embodiments may be described separately, they may be used separately or in any desired combination. Note that while the embodiments described herein relate to two PTRS ports and two TCI states, the present disclosure is not limited thereto. For example, there may be X PTRS ports and X TCI states, where X≥2.

Further, the description of the following embodiments focuses on NR; however, the embodiments may be applied to other types of radio access technologies.

PTRS Port to DMRS Port Association when Two Codewords are Scheduled

If a UE 604 is scheduled with two codewords, i.e. rank 5 or rank 6 transmission, and PTRS is enabled and:
two PTRS ports are configured,
two TCI states are indicated by one TCI code point, and
for each TCI state,
  if the TCI state is associated to two MCSs (i.e., the TCI state is associated with DMRS ports containing both codewords)
    then the PTRS port of that TCI state is associated with the lowest indexed DMRS port assigned for the codeword with the higher MCS within the DMRS ports corresponding to the TCI state,
  if the TCI state is associated to one MCS only (i.e., the TCI state is associated with DMRS ports containing only one of the two codewords)
    then the PTRS port of that TCI state is associated with the lowest indexed DMRS port associated with the TCI state
If the MCS indices of the two codewords are the same, then the first/second PTRS port is associated with the lowest indexed DMRS port within the DMRS ports corresponding to the first/second indicated TCI state respectively.

In the following examples, port x is denoted as port x-1000 for simplicity, e.g. port 1000 is described as port 0.

Also, note that TCI state 1 and 2 for DMRS type 1 is equivalent to selecting DMRS ports in Code Division Multiplexing (CDM) group A=0 and 1 respectively. Hence, these can be interchanged in the text above and below. For DMRS type 2, TCI state 1 is equivalent to CDM group 0. It is an open problem whether TCI state 2 is equivalent to CDM group 1 or CDM group 1+2. In the following, it is assumed that TCI state 2 is equivalent to CDM group 1+2.

Figure 7:
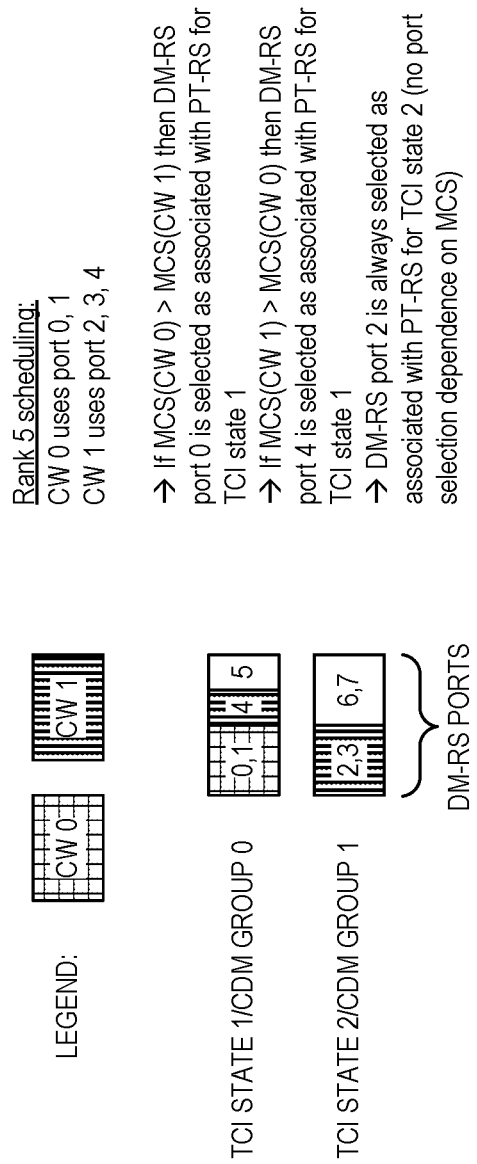
FIGS. 7 through 9 illustrate examples of embodiments of the present disclosure.

Example 1: For Type 1 DMRS, ports 0,1,4,5 belong to first a CDM group ($\lambda=0$) and ports 2,3,6,7 belong to a second CDM group ($\lambda=1$). Assume rank 5 scheduling where ports 0-4 are used assuming type 1 DMRS, then according to the Codeword to Layer (CW2L) mapping, CW0 uses ports 0,1 and CW1 uses ports 2,3,4. See FIG. 7. This leads to the following possible outcomes due to the present disclosure:

If MCS is higher for CW0 compared to CW1, then port 0 and port 2 are associated with PTRS for the first TCI state and the second TCI state, respectively. More specifically, in this example, CDM group ($\lambda$=0) corresponds to the first TCI state, and CDM group ($\lambda$=1) corresponds to the second TCI state. The first TCI state (corresponding to CDM group ($\lambda$=0) to which DMRS ports 0,1,4,5 belong) is associated with DMRS ports for both CW0 (ports 0,1) and CW1 (port 4). So, the PTRS port of the first TCI state is associated with the lowest indexed DMRS port assigned for CW0 (i.e., the codeword with the higher MCS) that is also within the DMRS ports corresponding to the first TCI state (i.e., the DMRS ports belonging to the first CDM group ($\lambda$=0)), which in this example is DMRS port 0. Conversely, the second TCI state (corresponding to the second CDM group ($\lambda$=1)) is associated with DMRS ports for only CW1 (i.e., DMRS ports 2,3 in this example). So, the PTRS port of the second TCI state is associated with the lowest indexed DMRS port associated with the second TCI state which, in this example, is DMRS port 2.

If MCS is higher for CW1 compared to CW0, then port 4 and port 2 are associated with PTRS for the first TCI state and the second TCI state, respectively. The first TCI state (corresponding to CDM group ($\lambda$=0) to which DMRS ports 0,1,4,5 belong) is associated with DMRS ports for both CW0 (ports 0,1) and CW1 (port 4). So, the PTRS port of the first TCI state is associated with the lowest indexed DMRS port assigned for CW1 (i.e., the codeword with the higher MCS) that is also within the DMRS ports corresponding to the first TCI state (i.e., the DMRS ports belonging to the first CDM group ($\lambda$=0)), which in this example is DMRS port 4. Conversely, the second TCI state (corresponding to the second CDM group ($\lambda$=1)) is associated with DMRS ports for only CW1 (i.e., DMRS ports 2,3 in this example). So, the PTRS port of the second TCI state is associated with the lowest indexed DMRS port associated with the second TCI state, which in this example, is DMRS port 2.

If MCS is same for CW1 and CW0, then port 0 and port 2 are associated with PTRS for the first TCI state and the second TCI state, respectively.

Figure 8:
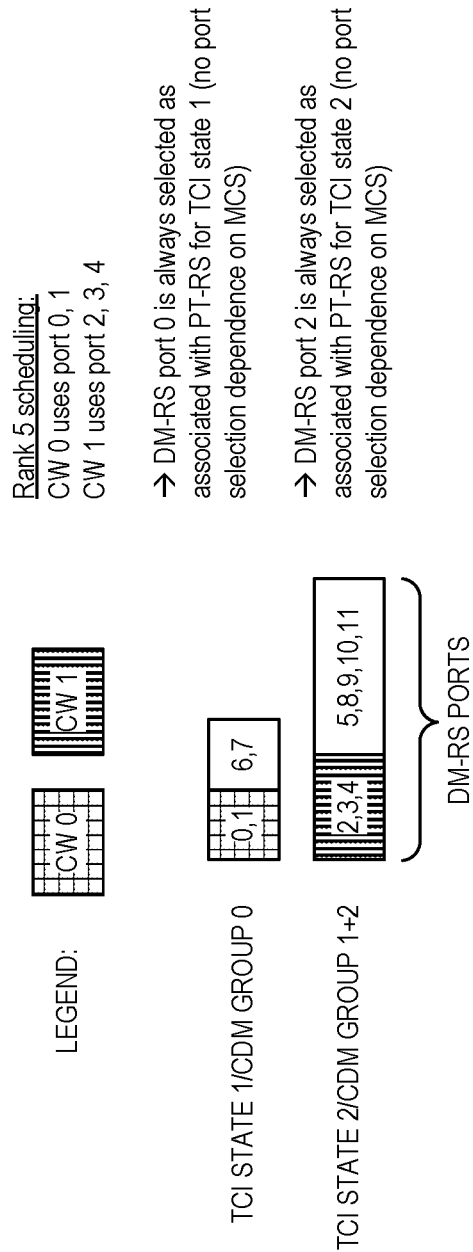
Figure 9:
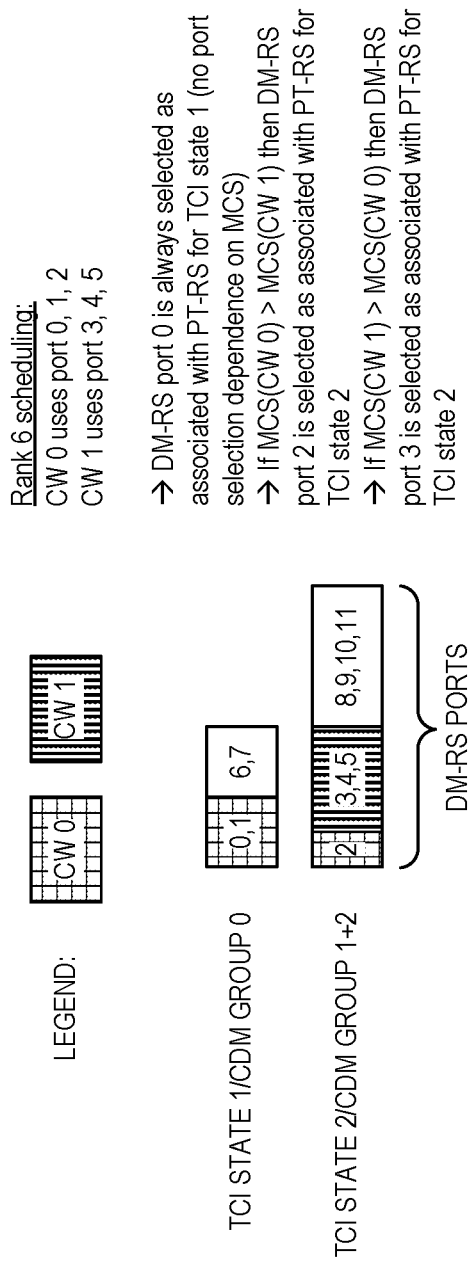

Moreover, if DMRS type 2 is used, and the PDSCH uses ports from all three CDM groups as in the case of two codeword transmission of rank 5 or 6, then the first TCI state is associated with DMRS ports for the first CDM group (e.g., CDM group 0 in FIGS. 8-9) and the second TCI state is associated with DMRS ports of the second and third CDM groups (e.g., CDM groups 1 and 2 in FIGS. 8-9).

Example 2: For type 2 DMRS, ports 0,1,6,7 ($\lambda$=0) belong to a first CDM group and ports 2,3,8,9 belong to a second CDM group ($\lambda$=1) and port 4,5,10,11 belongs to a third CDM group ($\lambda$=2). Assume rank 5 scheduling where ports 0-4 are used assuming type 2 DMRS, then according to CW2L mapping, CW0 uses ports 0,1 and CW1 uses ports 2,3,4. See FIG. 8. This implies that a codeword is mapped to one TCI state only and this leads to no change in behavior of the PTRS to DMRS association depending on MCS, i.e.:

If MCS is higher for CW0 compared to CW1, then port 0 and port 2 are associated with PTRS for the first TCI state and the second TCI state, respectively.

If MCS is higher for CW1 compared to CW0, then port 0 and port 2 are associated with PTRS for the first TCI state and the second TCI state, respectively.

If MCS is same for CW1 and CW0, then port 0 and port 2 are associated with PTRS for the first TCI state and the second TCI state, respectively.

Assume instead rank 6 scheduling where ports 0-5 are used assuming type 2 DMRS, then according to CW2L mapping, CW0 uses port 0,1,2 and CW1 uses port 3,4,5. This implies that CW0 is associated to two TCI states (i.e., may be transmitted across two transmission points), see FIG. 9, and hence:

If MCS is higher for CW0 compared to CW1, then port 0 and port 2 are associated with PTRS for the first TCI state and the second TCI state, respectively.

If MCS is higher for CW1 compared to CW0, then port 0 and port 3 are associated with PTRS for the first TCI state and the second TCI state, respectively.

If MCS is the same for CW1 and CW0, then port 0 and port 2 are associated with PTRS for the first TCI state and the second TCI state, respectively.

In another embodiment, when two TCI states are indicated in a Downlink Control Information (DCI) while DMRS ports within a single CDM group are indicated in the same DCI, a single PTRS port is used, if configured. The PTRS port is associated with the lowest indexed DMRS port in the indicated DMRS ports. The DMRS port is associated with the first TCI state in PDSCH resources allocated for the first TCI state and with the second TCI state in PDSCH resources allocated for the second TCI state.

Figure 10:
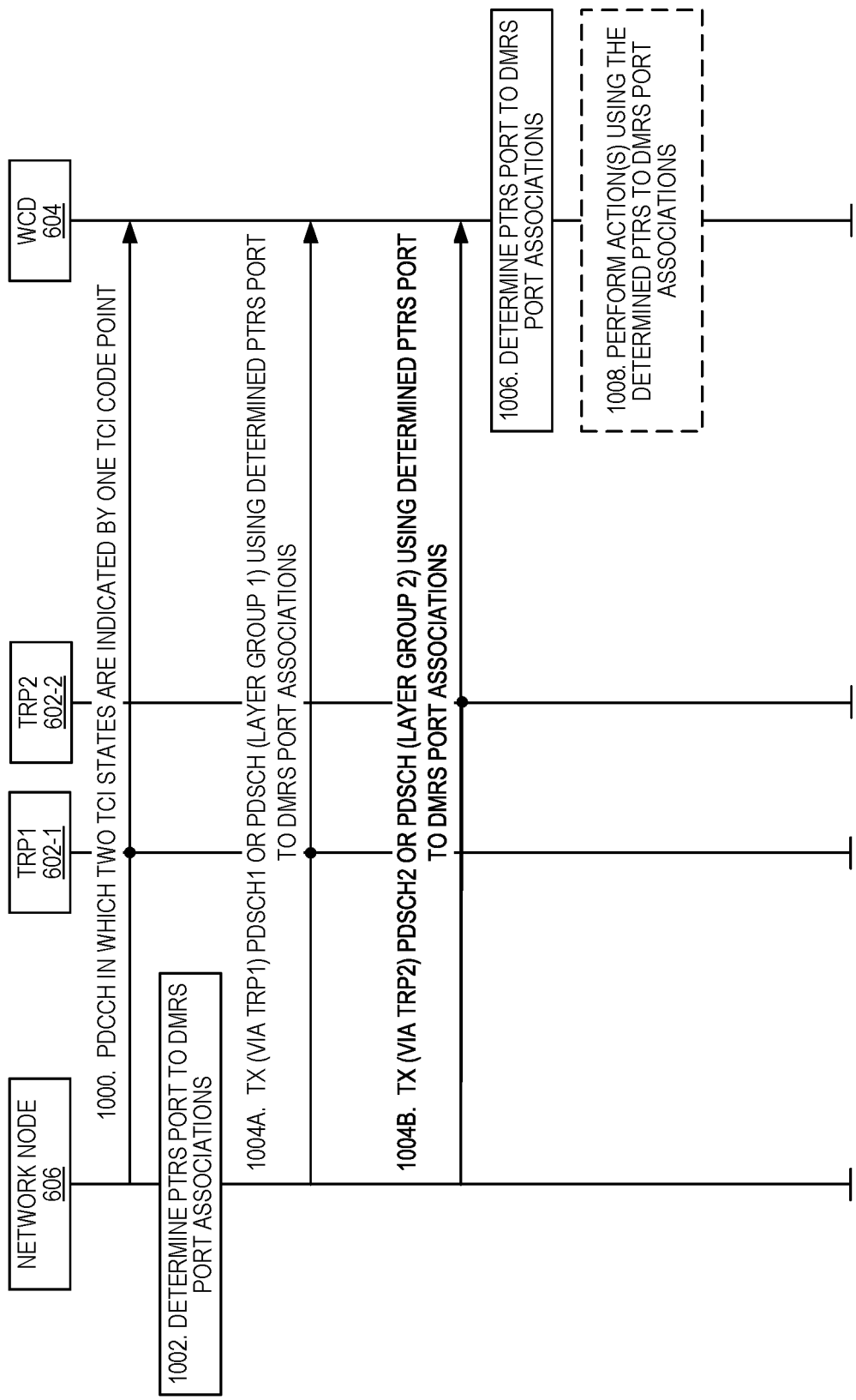
FIG. 10 illustrates the operation of a network node, TRPs, and a Wireless Communication Device (WCD) to perform a single-PDCCH multi-TRP transmission in which the PTRS port to DMRS port associations are determined in accordance with embodiments of the present disclosure.

FIG. 10 illustrates the operation of the network node 606, the TRPs 602-1 and 602-2, and the WCD 604 to perform a single-PDCCH multi-TRP transmission in which the PTRS port to DMRS port associations are determined as described above, in accordance with some embodiments of the present disclosure. Optional steps are represented by dashed lines/boxes. As illustrated, the network node 606 causes transmission of a PDCCH including DCI scheduling a multi-TRP transmission to the WCD 604 from the TRP 602-1 (step 1000). In some embodiments, the PDCCH, or DCI, includes an indication of two TCI states via a single TCI code point, as described above. In this example, two PTRS ports are configured. The network node 606 determines the PTRS port to DMRS port associations for the multi-TRP transmission in the manner described above (step 1002). The network node 606 causes the TRPs 602-1 and 602-2 to transmit the multi-TRP transmission to the WCD 604 (steps 1004A and 1004B).

At the WCD 604, the WCD 604 receives and decodes the PDCCH in step 1000. Using the information comprised in the DCI carried by the PDCCH, the WCD 604 determines the PTRS port to DMRS port associations for the multi-TRP transmission, as described above (step 1006). Optionally, the WCD 604 performs one or more actions using the determined PTRS port to DMRS port associations for the multi-TRP transmission (step 1008). For example, the WCD 604 may perform measurements on the PTRS in accordance with the determined PTRS port to DMRS port associations and, e.g., perform one or more operations using the performed measurements, as will be understood by those of ordinary skill in the art.

Figure 11:
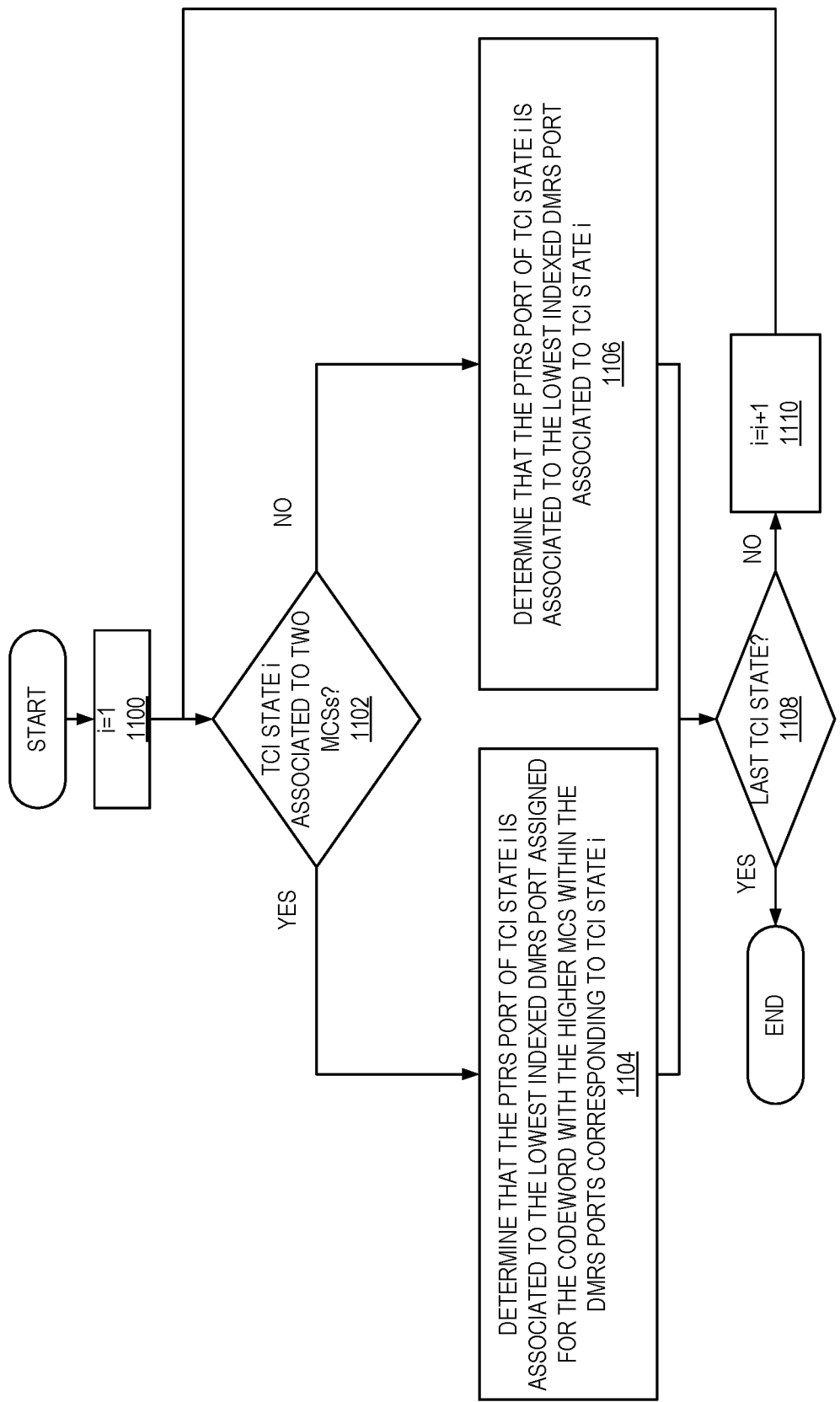
FIG. 11 is a flow chart that illustrates the operation of a node to determine PTRS port to DMRS port associations in accordance with an embodiment of the present disclosure.

FIG. 11 is a flow chart that illustrates the operation of a node (e.g., the network node 606 or the WCD 604) to determine the PTRS port to DMRS port associations for a multi-TRP transmission (e.g., a single-PDCCH multi-TRP PDSCH transmission) in accordance with at least some aspects of the embodiments described above. Note that this process may be performed in, e.g., step 1002 and/or step 1006 of FIG. 10.

In this example, two (or more) PTRS ports are configured and two (or more) TCI states are indicated by, e.g., a single TCI code point in the PDCCH. As illustrated, the node initializes a TCI state counter (i) to 1 (step 1100). The node determines whether TCI state i is associated to two (or more) MCSs (i.e., if TCI state i is associated with DMRS ports containing two (or more) codewords) (step 1102). If so, the node determines that the PTRS port of TCI state i is associated to the lowest indexed DMRS port assigned for the codeword with the higher MCS that is within the DMRS ports corresponding to TCI state i (step 1104). Otherwise (if TCI state i is associated to only one MCS), the node determines that the PTRS port of TCI state i is associated to the lowest indexed DMRS port associated to TCI state i (step 1106).

The node then determines whether TCI state i is the last TCI state (step 1108). If not, the TCI state counter, i, is incremented (step 1110), and the process returns to step 1102 and is repeated for the next TCI state. Once the PTRS port to DMRS port association is determined for all TCI states, the process ends.

PTRS Power Allocation

When a PDSCH and the associated PTRS is transmitted from a single TRP, the PTRS transmit power may be boosted when the PDSCH contains more than one spatial layer. In other words, the ratio of PTRS Energy Per Resource Element (EPRE) to PDSCH EPRE per layer per Resource Element (RE) for PTRS port can be greater than 0 decibels (dB). This is because for PTRS, only a single layer is transmitted while PDSCH can have multiple layers. For the same power amplifier output power, more power per layer can be allocated to PTRS compared to PDSCH when the PDSCH has more than one layer.

When a PDSCH with multiple layers is scheduled with two TCI states, a subset of the layers is transmitted from each of the two TRPs (i.e., a first subset of the layers is associated with a first TCI state that corresponds to a first TRP and a second subset of the layers is associated with a second TCI state that corresponds to the second TRP). If two PTRS ports are configured, each PTRS port is transmitted from one of the two TRPs (i.e., a first PTRS port is associated with the first TCI state that corresponds to the first TRP and a second PTRS port is associated with the second TCI state that corresponds to the second TRP). In this case, the amount of PTRS power allocation for a PTRS port would depend on the number of PDSCH layers scheduled over the same TRP (i.e., would depend on the number of PDSCH layers associated with the same TCI state). Thus, as an example, the amount of PTRS power allocation for a PTRS port in steps 1004A and 1004B of FIG. 10 depends on the number of PDSCH layers scheduled over the same TRP (i.e., depends on the number of PDSCH layers associated with the same TCI state), in some embodiments.

For example, consider a scenario in which a PDSCH with 3 layers is scheduled with two layers over TRP1 and one layer over TRP2. DMRS ports #0 and #1 are associated with the TRP1 and DMRS port #2 is associated with TRP2. If two PTRS ports are configured, PTRS port #0 would be associated with DMRS port #0 and PTRS port #1 with DMRS port #2. Then the power boosting ratio for PTRS port #0 can be up to 3 dB, while for PTRS port #1, no power boosting can be done. Therefore, in general the amount of power boosting for the two PTRS ports can be different. Table 8 is an example of PTRS power allocation when two PTRS are configured and a UE is scheduled with two TCI states.

TABLE 8

An example of PTRS power allocation for a PTRS port when two PTRS ports are configured. Power allocation for a PTRS port associated with a TCI state

| epre-Ratio | The number of PDSCH layers associated with the same TCI state | | | |
|---|---|---|---|---|
| | 1 | 2 | 3 | 4 |
| 0 | 0 | 3 | 4.77 | 6 |
| 1 | 0 | 0 | 0 | 0 |
| 2 | | | reserved | |
| 3 | | | reserved | |

Additional Description

Some example embodiments of the present disclosure are described below as proposals for issues in 3GPP RAN WG1 #99 related to multi-TRP operation in NR.

Remaining issues for single PDCCH based multi-TRP scheduling

PTRS port to DMRS port association for rank 5 and 6

In Release 15 downlink PTRS procedures, in case two codewords (CWs) are scheduled to be transmitted (rank 5 or 6), the PTRS port is associated to the DMRS port that belongs to the CW with highest MCS. This increases the probability that the Signal to Noise Ratio (SNR) for the layer that PTRS is associated with has a high SNR and as evaluations have shown during Release 15, this improves phase tracking performance and throughput.

During the previous meeting it was agreed for the case of two PTRS ports, the first/second PTRS port is associated with the lowest indexed DMRS port within the DMRS ports corresponding to the first/second indicated TCI state, respectively. However, this agreement implies that for 2 CW transmissions, the PTRS ports may in some cases be mapped to the layer with the worst SNR.

Therefore, we propose the following for rank 5 and 6 cases:

Proposal:
If a UE is scheduled with two codewords and two PTRS ports are configured for single-PDCCH based multi-TRP/panel transmission at least for enhanced Mobile Broadband (eMBB) and Ultra-Reliable and Low Latency Communication (URLLC) scheme 1a, and if two TCI states are indicated by one TCI code point, and for each TCI state, if the TCI state is associated to two MCSs (i.e., the TCI state is associated with two codewords)

then the first PTRS port is associated with the lowest indexed DMRS port assigned for the codeword with the higher MCS within the DMRS ports corresponding to the TCI state If the MCS indices of the two codewords are the same, then the first/second PTRS port is associated with the lowest indexed DMRS port within the DMRS ports corresponding to the first/second indicated TCI state We provide an example: For Type 1 DMRS, ports 0,1,4,5 belong to the first CDM group and ports 2,3,6,7 belong to the second CDM group. Assume rank 5 scheduling where ports 0-4 are used, then according to CW2L mapping, CW0 uses port 0,1 and CW1 uses port 2,3,4. This leads to the following cases:

If MCS is higher for CW0 compared to CW1, then port 0 and port 2 are associated with PTRS for the first TCI state and the second TCI state, respectively.

If MCS is higher for CW1 compared to CW0, then port 4 and port 2 are associated with PTRS for the first TCI state and the second TCI state, respectively.

If MCS is same for CW1 and CW0, then port 0 and port 2 are associated with PTRS for the first TCI state and the second TCI state, respectively.

The case of single CDM group, 2 TCI states and 2 PTRS ports

Furthermore, we propose the following fallback in case of 2 PTRS ports, 2 TCI states are configured but a single CDM group is used for the PDSCH.

Proposal: If a TCI code point indicates two TCI states and indicated DMRS ports are from single CDM group, and if two PTRS ports are enabled, then a single PTRS port is transmitted.

Figure 12:
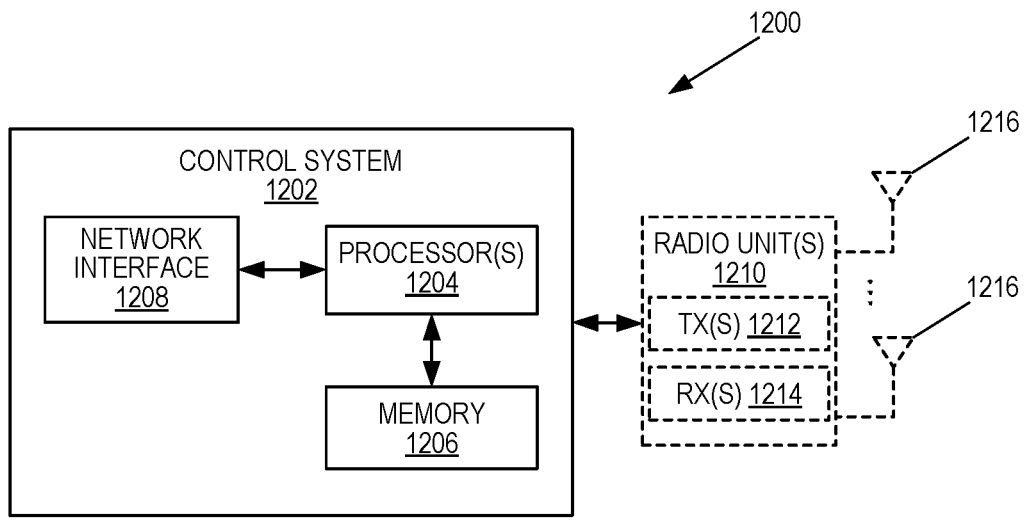
FIGS. 12 through 14 are schematic block diagrams of example embodiments of a network node.

FIG. 12 is a schematic block diagram of a network node 1200 according to some embodiments of the present disclosure. Optional features are represented by dashed boxes. The network node 1200 may be, for example, the network node 1200 a network node that implements all or part of the functionality of the network node (e.g., a base station implementing the functionality of the network node 606 and, e.g., the TRP 602-1) described herein. As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, if the network node 1200 is a radio access node, the network node 1200 may include one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of the network node 606 or a network node that implements at least part of the functionality of the network node, as described herein. In some embodiments, the function(s) are implemented in software that is stored, e.g., in the memory 1206 and executed by the one or more processors 1204.

Figure 13:
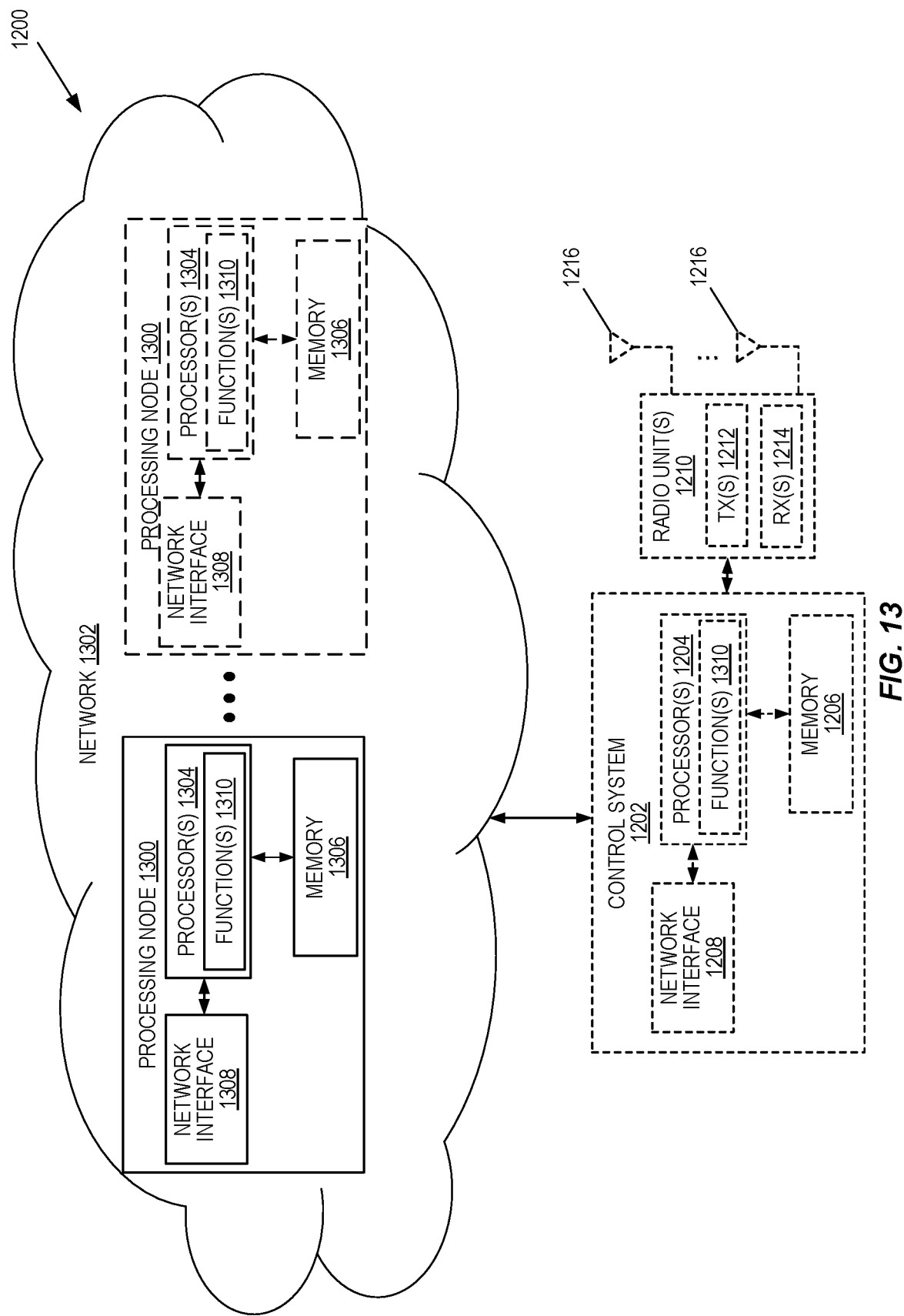

FIG. 13 is a schematic block diagram that illustrates a virtualized embodiment of the network node 1200 according to some embodiments of the present disclosure. As used herein, a "virtualized" network node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the radio access node 1200 includes one or more processing nodes 1300 coupled to or included as part of a network(s) 1302. Each processing node 1300 includes one or more processors 1304 (e.g., CPUs, ASICs, FPGAs, and/or the like), memory 1306, and a network interface 1308. If the network node 1200 is a radio access node, the network node 1200 may include the control system 1202 and/or the one or more radio units 1210, as described above. The control system 1202 may be connected to the radio unit(s) 1210 via, for example, an optical cable or the like. If present, the control system 1202 or the radio unit(s) are connected to the processing node(s) 1300 via the network 1302.

In this example, functions 1310 of the network node 1200 described herein (e.g., one or more functions of the network node 606 described herein) are implemented at the one or more processing nodes 1300 or distributed across the one or more processing nodes 1300 and the control system 1202 and/or the radio unit(s) 1210 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of the network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
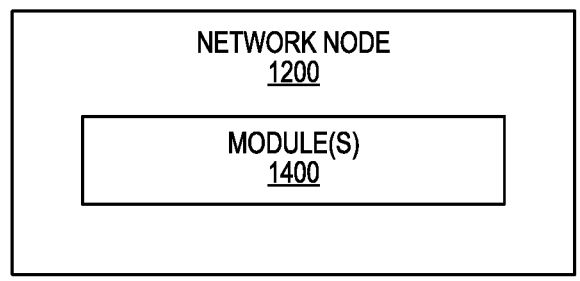

FIG. 14 is a schematic block diagram of the network node 1200 according to some other embodiments of the present disclosure. The radio access node 1200 includes one or more modules 1400, each of which is implemented in software. The module(s) 1400 provide the functionality of the network node 1200 described herein (e.g., one or more functions of the network node 606 described herein). This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
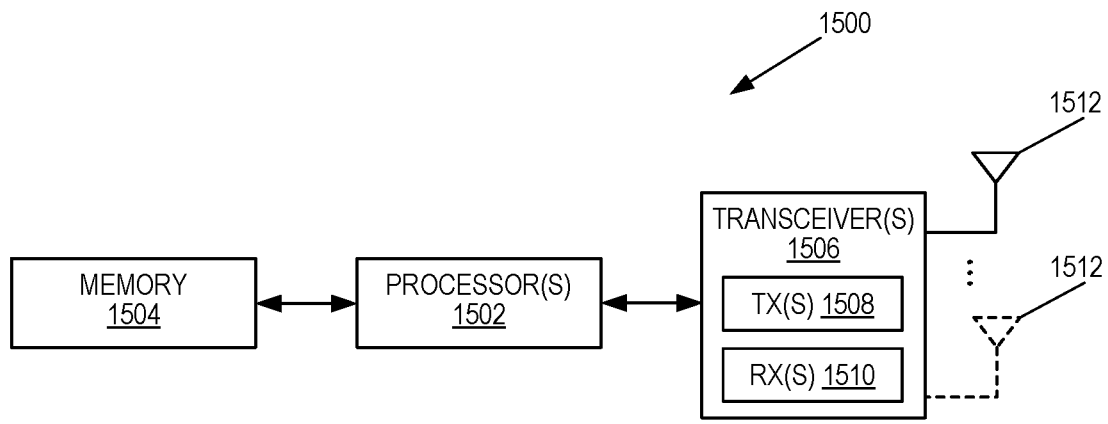
FIGS. 15 and 16 are schematic block diagrams of example embodiments of a WCD.

FIG. 15 is a schematic block diagram of a wireless communication device 1500 (e.g., the WCD 604 or UE described herein) according to some embodiments of the present disclosure. As illustrated, the wireless communication device 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the wireless communication device 1500 described above (e.g., one or more functions of a UE or the WCD 604 described herein) may be fully or partially implemented in software that is, e.g., stored in the memory 1504 and executed by the processor(s) 1502. Note that the wireless communication device 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the wireless communication device 1500 and/or allowing output of information from the wireless communication device 1500), a power supply (e.g., a battery and associated power circuitry), etc.

In some embodiments, a computer program including instructions which, when executed by at least one processor, causes the at least one processor to carry out the functionality of the wireless communication device 1500 according to any of the embodiments described herein (e.g., one or more functions of a UE or the WCD 604 described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
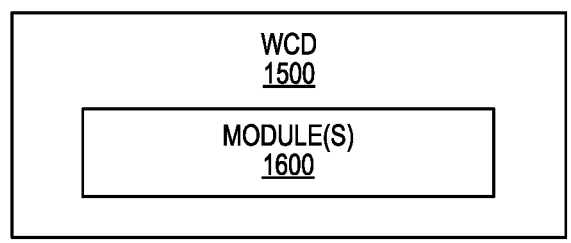

FIG. 16 is a schematic block diagram of the wireless communication device 1500 according to some other embodiments of the present disclosure. The wireless communication device 1500 includes one or more modules 1600, each of which is implemented in software. The module(s) 1600 provide the functionality of the wireless communication device 1500 described herein (e.g., one or more functions of a UE or the WCD 604 described herein).

Figure 17:
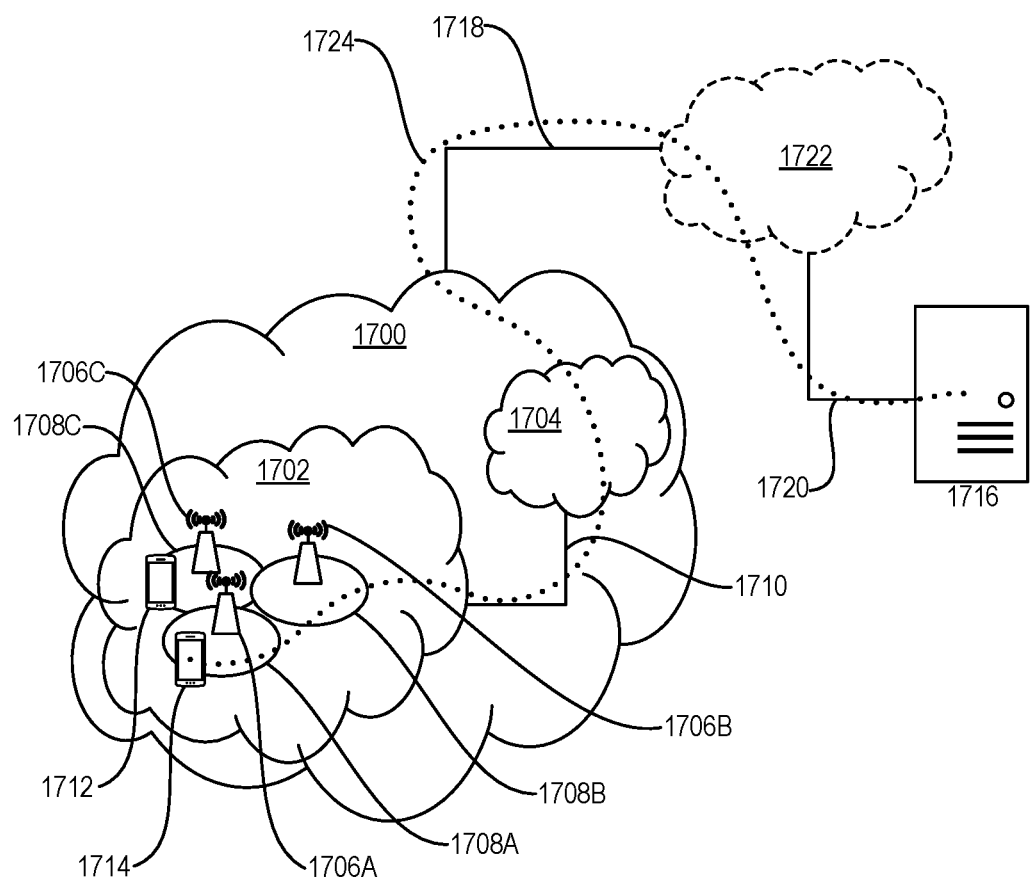
FIG. 17 illustrates an example embodiment of a communication system in which embodiments of the present disclosure may be implemented.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
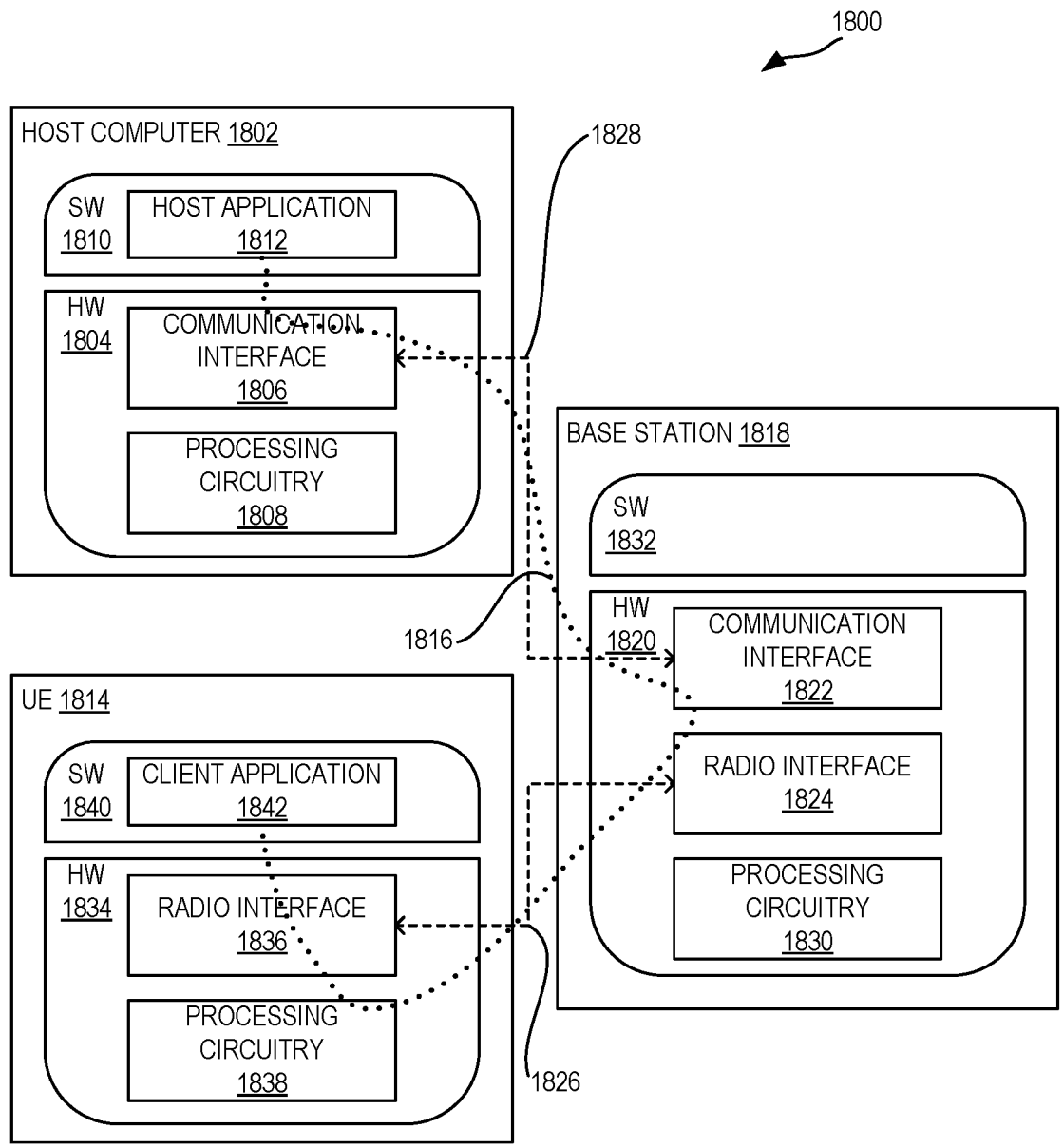
FIG. 18 illustrates example embodiments of the host computer, base station, and UE of FIG. 17.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the data rate and thereby provide benefits such as, e.g., reduced user waiting time, relaxed restriction on file size, better responsiveness, or the like.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device, WCD, (604), the method comprising: determining (1006) one or more Phase Tracking Reference Signal, PTRS, port to Demodulation Reference Signal, DMRS, port associations for a multi-TRP downlink transmission to the WCD (604), wherein determining (1006) the one or more PTRS port to DMRS port associations comprises, for each TCI state of two (or more) TCI states used for the multi-TRP downlink transmission: determining (1102) whether the TCI state is associated to two (or more) Modulation and Coding Schemes, MCSs, and, upon determining (1102, YES) that the TCI state is associated to two (or more) MCSs, determining (1104) that a PTRS port of the TCI state is associated to a lowest indexed DMRS port assigned for a one of two (or more) codewords transmitted by the multi-TRP transmission having a higher MCS (e.g., highest MCS from among the MCSs for the codewords) that is also within a set of DMRS ports associated to the TCI state.

Embodiment 2: The method of embodiment 1 wherein, upon determining (1102, NO) that the TCI state is associated to only one MCS, determining (1164) that the PTRS port of the TCI state is associated to a lowest indexed DMRS port within the set of DMRS ports associated to the TCI state.

Embodiment 3: The method of embodiment 1 or 2 further comprising receiving (1000), from a first transmission/reception point, TRP, (602-1) of two (or more) TRPs used for the multi-TRP transmission, downlink control information that schedules the multi-TRP downlink transmission, the downlink control information comprising an indication of the two (or more) TCI states for the multi-TRP downlink transmission.

Embodiment 4: The method of embodiment 3 wherein the indication of the two (or more) TCI states is a single TCI code point.

Embodiment 5: The method of any of embodiments 1 to 4 wherein the multi-TRP downlink transmission is a single-PDCCH based multi-TRP PDSCH transmission.

Embodiment 6: The method of any of embodiments 1 to 5 wherein an amount of PTRS power allocation for each PTRS port depends on the number of PDSCH layers scheduled over the same TRP.

Embodiment 7: The method of any of embodiments 1 to 6 further comprising receiving (1004A, 1004B) the multi-TRP downlink transmission.

Embodiment 8: The method of any of embodiments 1 to 7 further comprising (1008) performing one or more actions using the determined PTRS port to DMRS port associations.

Embodiment 9: The method of any of the previous embodiments, further comprising: receiving user data from a host computer via the transmission from the base station.

Group B Embodiments

Embodiment 10: A method performed by a network node (606), the method comprising: determining (1002) one or more Phase Tracking Reference Signal, PTRS, port to Demodulation Reference Signal, DMRS, port associations for a multi-TRP downlink transmission to a wireless communication device, WCD, (604), wherein determining (1002A) the one or more PTRS port to DMRS port associations comprises, for each TCI state of two (or more) TCI states used for the multi-TRP downlink transmission: determining (1102) whether the TCI state is associated to two (or more) Modulation and Coding Schemes, MCSs, and, upon determining (1102, YES) that the TCI state is associated to two (or more) MCSs, determining (1104) that a PTRS port of the TCI state is associated to a lowest indexed DMRS port assigned for a one of two (or more) codewords transmitted by the multi-TRP transmission having a higher MCS (e.g., highest MCS from among the MCSs for the codewords) that is also within a set of DMRS ports associated to the TCI state.

Embodiment 11: The method of embodiment 10 wherein, upon determining (1102, NO) that the TCI state is associated to only one MCS, determining (1164) that the PTRS port of the TCI state is associated to a lowest indexed DMRS port within the set of DMRS ports associated to the TCI state.

Embodiment 12: The method of embodiment 10 or 11 further comprising transmitting (1000), to the WCD (604) via a first radio access node (TRP1 602-1), downlink control information that schedules the multi-TRP downlink transmission, the downlink control information comprising an indication of the two (or more) TCI states for the multi-TRP downlink transmission.

Embodiment 13: The method of embodiment 12 further comprising transmitting (1004A), to the WCD (604) via a first radio access node (TRP1 602-1), a first part (PDSCH1 or layer group 1) of the multi-TRP downlink transmission.

Embodiment 14: The method of embodiment 13 further comprising transmitting (1004B), to the WCD (604) via a second radio access node (TRP2 602-2), a second part (PDSCH2 or layer group 2) of the multi-TRP downlink transmission.

Embodiment 15: The method of any of embodiments 12 to 14 wherein the indication of the two (or more) TCI states is a single TCI codeword.

Embodiment 16: The method of any of embodiments 10 to 15 wherein the multi-TRP downlink transmission is a single-PDCCH multi-TRP PDSCH transmission.

Embodiment 17: The method of any of embodiments 10 to 16 wherein an amount of PTRS power allocation for each PTRS port depends on the number of PDSCH layers scheduled over the same TRP.

Embodiment 18: The method of any of the previous embodiments, further comprising: obtaining user data from a host computer; and forwarding the user data to the wireless communication device.

Group C Embodiments

Embodiment 19: A wireless communication device comprising: processing circuitry configured to perform any of the steps of any of the Group A embodiments; and power supply circuitry configured to supply power to the wireless communication device.

Embodiment 20: A network node comprising: processing circuitry configured to perform any of the steps of any of the Group B embodiments; and power supply circuitry configured to supply power to the network node.

Embodiment 21: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 23: The communication system of the previous embodiment further including the base station.

Embodiment 24: The communication system of the previous 2 embodiments, further including the UE, wherein the UE is configured to communicate with the base station.

Embodiment 25: The communication system of the previous 3 embodiments, wherein: the processing circuitry of the host computer is configured to execute a host application, thereby providing the user data; and the UE comprises processing circuitry configured to execute a client application associated with the host application.

Embodiment 26: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 27: The method of the previous embodiment, further comprising, at the base station, transmitting the user data.

Embodiment 28: The method of the previous 2 embodiments, wherein the user data is provided at the host computer by executing a host application, the method further comprising, at the UE, executing a client application associated with the host application.

Embodiment 29: A User Equipment, UE, configured to communicate with a base station, the UE comprising a radio interface and processing circuitry configured to perform the method of the previous 3 embodiments.

Embodiment 30: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 31: The communication system of the previous embodiment, wherein the cellular network further includes a base station configured to communicate with the UE.

Embodiment 32: The communication system of the previous 2 embodiments, wherein: the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 34: The method of the previous embodiment, further comprising at the UE, receiving the user data from the base station.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Function
AP Access Point
ASIC Application Specific Integrated Circuit
AUSF Authentication Server Function
BLER Block Error Rate
CDM Code Division Multiplexing
CPU Central Processing Unit
CSI Channel State Information
CSI-RS Channel State Information Reference Signal
CW Codeword
CW2L Codeword to Layer
dB Decibel
DCI Downlink Control Information
DMRS Demodulation Reference Signal
DSP Digital Signal Processor
eMBB Enhanced Mobile Broadband
eNB Enhanced or Evolved Node B
EPC Evolved Packet Core
EPRE Energy Per Resource Element
EPS Evolved Packet System E-UTRA Evolved Universal Terrestrial Radio Access
FPGA Field Programmable Gate Array
gNB New Radio Base Station
gNB-CU New Radio Base State Central Unit
gNB-DU New Radio Base Station Distributed Unit
HSS Home Subscriber Server
ID Identifier
IoT Internet of Things
LTE Long Term Evolution
MCS Modulation and Coding Scheme
MIMO Multiple Input Multiple Output
MME Mobility Management Entity
MTC Machine Type Communication
NEF Network Exposure Function
NF Network Function
ng-eNB Next Generation Enhanced or Evolved Node B
NR New Radio
NRF Network Function Repository Function
NSSF Network Slice Selection Function
OFDM Orthogonal Frequency Division Multiplexing
OTT Over-the-Top
PBCH Physical Broadcast Channel
PC Personal Computer
PCF Policy Control Function
PDCCH Physical Downlink Control Channel
PDSCH Physical Downlink Shared Channel
P-GW Packet Data Network Gateway
PRB Physical Resource Block
PTRS Phase Tracking Reference Signal
PUSCH Physical Uplink Shared Channel
QCL Quasi Co-located
RAM Random Access Memory
RAN Radio Access Network
RE Resource Element
ROM Read Only Memory
RPF Repetition Factor
RRC Radio Resource Control
RRH Remote Radio Head
RS Reference Signal
Rx Receive
SCEF Service Capability Exposure Function
SINR Signal to Interference plus Noise Ratio
SMF Session Management Function
SNR Signal to Noise Ratio
SS Synchronization Signal
TCI Transmission Configuration Indication
TD-OCC Time Domain Orthogonal Cover Code
TRP Transmission/Reception Point
TRS Tracking Reference Signal
TS Technical Specification
UDM Unified Data Management
UE User Equipment
UPF User Plane Function
URLLC Ultra-Reliable and Low Latency Communication
WCD Wireless Communication Device Those skilled in the art will recognize improvements and modifications to the embodiments of the present disclosure. All such improvements and modifications are considered within the scope of the concepts disclosed herein.

The invention claimed is:

1. A method performed by a Wireless Communication Device, WCD, the method comprising:
receiving a Physical Downlink Control Channel, PDCCH, comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
determining a Phase Tracking Reference Signal, PTRS, port to DMRS port association for the PDSCH transmission, wherein:
a single PTRS port is used for the PDSCH transmission; and
determining the PTRS port to DMRS port association comprises determining that the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

2. The method of claim 1 further comprising receiving the single PTRS port associated with the lowest indexed DMRS port in the DMRS ports indicated in the DCI.

3. A Wireless Communication Device, WCD, for a cellular communications system, the WCD comprising:
one or more transmitters;
one or more receivers; and
processing circuitry associated with the one or more transmitters and the one or more receivers, the processing circuitry configured to cause the WCD to:
receive a Physical Downlink Control Channel, PDCCH, comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
determine a Phase Tracking Reference Signal, PTRS, port to DMRS port association for the PDSCH transmission, wherein:
a single PTRS port is used for the PDSCH transmission; and
determining the PTRS port to DMRS port association comprises determining that the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

4. A method performed by a Wireless Communication Device, WCD, the method comprising:
receiving a Physical Downlink Control Channel, PDCCH, comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
receiving a single Phase Tracking Reference Signal, PTRS, port for the PDSCH transmission, wherein the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

5. A Wireless Communication Device, WCD, for a cellular communications system, the WCD comprising:
one or more transmitters;
one or more receivers; and
processing circuitry associated with the one or more transmitters and the one or more receivers, the processing circuitry configured to cause the WCD to:
receive a Physical downlink Control Channel, PDCCH, comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
receive a single Phase Tracking Reference Signal, PTRS, port for the PDSCH transmission, wherein the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

6. A method performed by a network node of a cellular communications system, the method comprising:
transmitting or initiating transmission of a Physical Downlink Control Channel, PDCCH, to a Wireless Communication Device, WCD, the PDCCH comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
determining a Phase Tracking Reference Signal, PTRS, port to DMRS port association for the PDSCH transmission, wherein:
a single PTRS port is used for the PDSCH transmission; and
determining the PTRS port to DMRS port association comprises determining that the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

7. The method of claim 6 further comprising transmitting or initiating transmission of the single PTRS port associated with the lowest indexed DMRS port in the DMRS ports indicated in the DCI.

8. A network node for a cellular communications system, the network node comprising processing circuitry configured to cause the network node to:
transmit or initiate transmission of a Physical Downlink Control Channel, PDCCH, to a Wireless Communication Device, WCD, the PDCCH comprising Downlink Control Information, DCI, that indicates:
two Transmission Configuration Indication, TCI, states for a Physical Downlink Shared Channel, PDSCH, transmission to the WCD; and
Demodulation Reference Signal, DMRS, ports within a single Code Division Multiplexing, CDM, group; and
determine a Phase Tracking Reference Signal, PTRS, port to Demodulation Reference Signal, DMRS, port association for the PDSCH transmission, wherein:
a single PTRS port is used for the PDSCH transmission; and
determining the PTRS port to DMRS port association comprises determining that the single PTRS port is associated with a lowest indexed DMRS port in the DMRS ports indicated in the DCI,
wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

9. A method performed by a network node of a cellular communications system, the method comprising:
- transmitting or initiating transmission of a Physical Downlink Control Channel, PDCCH, to a Wireless Communication Device, WCD, the PDCCH comprising Downlink Control Information, DCI, that indicates:
  - two Transmission Configuration Indication, TCI, states for a Physical Downlink Shared Channel, PDSCH, transmission to the WCD; and
  - Demodulation Reference Signal, DMRS, ports within a single Code Division Multiplexing, CDM, group; and
- transmitting or initiating transmission of a single Phase Tracking Reference Signal, PTRS, port for the PDSCH transmission, wherein the single PTRS port is associated with a lowest indexed DMRS port in the DMRS ports indicated in the DCI,
- wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

10. A network node for a cellular communications system, the network node comprising processing circuitry configured to cause the network node to:
- transmit or initiate transmission of a Physical Downlink Control Channel, PDCCH, to a Wireless Communication Device, WCD, the PDCCH comprising Downlink Control Information, DCI, that indicates:
  - two Transmission Configuration Indication, TCI, states for a Physical Downlink Shared Channel, PDSCH, transmission to the WCD; and
  - Demodulation Reference Signal, DMRS, ports within a single Code Division Multiplexing, CDM, group; and
- transmit or initiate transmission of a single Phase Tracking Reference Signal, PTRS, port for the PDSCH transmission, wherein the single PTRS port is associated with a lowest indexed DMRS port in the DMRS ports indicated in the DCI,
- wherein a lowest indexed DMRS port in the DMRS ports indicated in the DCI is: (a) associated with a first TCI state from among the two TCI states for the PDSCH transmission in PDSCH resources allocated for the first TCI state and (b) associated with a second TCI state from among the two TCI states for the PDSCH transmission in PDSCH resources allocated for the second TCI state, wherein the single PTRS port is one of two PTRS ports configured for the WCD and wherein the WCD is scheduled with two codewords and wherein a PTRS port to DMRS port association for each TCI state is determined from a subset of DMRS ports that belong to a codeword with a highest Modulation and Coding Scheme (MCS).

* * * * *